United States Patent
Alsina et al.

(10) Patent No.: US 9,424,405 B2
(45) Date of Patent: Aug. 23, 2016

(54) USING RECEIPTS TO CONTROL ASSIGNMENTS OF ITEMS OF CONTENT TO USERS

(71) Applicant: Apple Inc., Cupertino, CA (US)

(72) Inventors: Thomas M. Alsina, Cupertino, CA (US); Todd R. Fernandez, Mountain View, CA (US); Jean-Pierre Ciudad, San Francisco, CA (US); Raymond N. Walsh, San Jose, CA (US); Sean B. Kelly, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/913,312

(22) Filed: Jun. 7, 2013

(65) Prior Publication Data

US 2014/0150123 A1 May 29, 2014

Related U.S. Application Data

(63) Continuation-in-part of application No. 13/728,457, filed on Dec. 27, 2012.

(60) Provisional application No. 61/730,897, filed on Nov. 28, 2012.

(51) Int. Cl.
*H04L 29/06* (2006.01)
*G06F 21/12* (2013.01)
*G06F 21/10* (2013.01)

(52) U.S. Cl.
CPC ............ *G06F 21/121* (2013.01); *G06F 21/10* (2013.01)

(58) Field of Classification Search
CPC .............................. G06F 21/121; G06F 21/10

USPC ...................................................... 726/28, 33
See application file for complete search history.

(56) References Cited

U.S. PATENT DOCUMENTS

| | | | |
|---|---|---|---|
| 6,351,812 B1 * | 2/2002 | Datar et al. .................... | 713/182 |
| 6,487,658 B1 * | 11/2002 | Micali ........................... | 713/158 |
| 7,401,083 B2 * | 7/2008 | Daemke ................. | G06F 21/604 |
| 8,484,100 B2 | 7/2013 | Feldman et al. | |
| 8,719,586 B1 * | 5/2014 | Paleja et al. .................. | 713/187 |
| 9,231,939 B1 * | 1/2016 | Morrison ............ | H04L 63/0815 |
| 2002/0004773 A1 * | 1/2002 | Xu et al. ......................... | 705/36 |
| 2005/0144019 A1 | 6/2005 | Murakami et al. | |

(Continued)

FOREIGN PATENT DOCUMENTS

EP 1936526 A1 6/2008

*Primary Examiner* — Jeffrey Pwu
*Assistant Examiner* — William Corum, Jr.
(74) *Attorney, Agent, or Firm* — Page Ponsford; DLA Piper LLP US

(57) ABSTRACT

The described embodiments comprise an electronic device that executes an application, the electronic device including a processing subsystem. In these embodiments, the processing subsystem is configured to acquire a receipt associated with the application, wherein the application was purchased by a purchasing entity and installed on the electronic device after being assigned to a user of the electronic device by the purchasing entity. The processing subsystem is further configured to determine, using the receipt, if the application has expired. When the application has not expired, The processing subsystem is configured to execute the application with predetermined functions of the application enabled. When the application has expired, The processing subsystem is configured to execute the application with the predetermined functions of the application disabled.

27 Claims, 14 Drawing Sheets

(56) References Cited

U.S. PATENT DOCUMENTS

| | | |
|---|---|---|
| 2005/0246193 A1 | 11/2005 | Roever et al. |
| 2006/0129803 A1* | 6/2006 | Gentry et al. ................ 713/156 |
| 2006/0167811 A1 | 7/2006 | Bhambri et al. |
| 2007/0234047 A1* | 10/2007 | Miyazawa ................... 713/158 |
| 2007/0237332 A1 | 10/2007 | Lyle |
| 2008/0086777 A1* | 4/2008 | Sanchez ......................... 726/26 |
| 2008/0168167 A1 | 7/2008 | Calrson et al. |
| 2009/0144540 A1* | 6/2009 | Davis et al. ................. 713/156 |
| 2010/0262959 A1 | 10/2010 | Bruno et al. |
| 2011/0162085 A1* | 6/2011 | Nagasaki ........................ 726/28 |
| 2011/0231280 A1 | 9/2011 | Farah |
| 2012/0095877 A1* | 4/2012 | Ciudad et al. ............... 705/27.1 |
| 2012/0102008 A1 | 4/2012 | Kaariainen et al. |
| 2013/0019237 A1* | 1/2013 | Pardehpoosh et al. ....... 717/171 |
| 2013/0085755 A1* | 4/2013 | Bringert et al. ............... 704/235 |
| 2013/0144755 A1* | 6/2013 | Mowatt ................. G06Q 30/06 705/26.41 |
| 2013/0225266 A1* | 8/2013 | Mir et al. ........................ 463/25 |
| 2014/0283092 A1* | 9/2014 | Mowatt et al. ................. 726/26 |

\* cited by examiner

PURCHASED
LIST
302

| ACCOUNT INFORMATION 406 | | |
|---|---|---|
| ITEM OF CONTENT 400 | NFA 402 | DATA 404 |
| EBOOK - GONE WITH ... | 3 | XYZ |
| APPLICATION 326 | 1 | QPD |
| WORD PROCESSOR | 4 | XZY |
| MEDIA – EDU. MOVIE | 5 | XSA |

FIG. 4

PURCHASED
LIST
304

| ITEM OF CONTENT 500 | NFA 502 | DATA 504 |
|---|---|---|
| EBOOK - GONE WITH ... | 3 | PFQ |
| APPLICATION 326 | 1 | RAM |
| WORD PROCESSOR | 4 | NYO |
| MEDIA – EDU. MOVIE | 5 | UMA |

FIG. 5

USER-
ASSIGNMENT
TABLE
306

| USER ID 600 | APP 326 | EBOOK 604 | DATA 606 |
|---|---|---|---|
| 1063 | Y | - | NXX |
| 2310 | R | Y | PDQ |
| 0768 | - | Y | YEH |
| 1542 | - | Y | UOF |

FIG. 6

ASSIGNMENT MESSAGE 308

| USER ID 700 | IOC 702 | A/R 704 | DATA 706 |
|---|---|---|---|
| 1063 | APP 326 | A | WDJ |

FIG. 7

USER-ASSIGNMENT TABLE 310

| FIRST ID 800 | SECOND ID 802 | APP 326 | EBOOK 806 | DATA 808 |
|---|---|---|---|---|
| 1063 |  | Y | - | PQQ |
| 2310 | CHARLIE | R | Y | LSA |
| 0768 | MONK3Y | Y | Y | MZL |
| 1542 | BOB_JONES | - | Y | TWV |

FIG. 8

USER IDENTITY MESSAGE 314

| FIRST ID 900 | SECOND ID 902 | DATA 904 |
|---|---|---|
| 1063 | BIGBOY99 | PHZ |

FIG. 9

USER-ASSIGNMENT TABLE 310

| FIRST ID 800 | SECOND ID 802 | APP 326 | EBOOK 806 | DATA 808 |
|---|---|---|---|---|
| 1063 | BIGBOY99 | Y | - | FPX |
| 2310 | CHARLIE | R | Y | LSA |
| 0768 | MONK3Y | Y | Y | MZL |
| 1542 | BOB_JONES | - | Y | TWV |

FIG. 10

USER-
ASSIGNMENT
TABLE
306

| USER ID 600 | APP 326 | EBOOK 604 | DATA 606 |
|---|---|---|---|
| 1063 | R | - | NXX |
| 2310 | R | Y | PDQ |
| 0768 | - | Y | YEH |
| 1542 | - | Y | UOF |

FIG. 12

REVOCATION
MESSAGE
1100

| USER ID 700 | IOC 702 | A/R 704 | DATA 706 |
|---|---|---|---|
| 1063 | APP 326 | R | PKC |

FIG. 13

USER-
ASSIGNMENT
TABLE
310

| FIRST ID 800 | SECOND ID 802 | APP 326 | EBOOK 806 | DATA 808 |
|---|---|---|---|---|
| 1063 | BIGBOY99 | R | - | FPP |
| 2310 | CHARLIE | R | Y | LSA |
| 0768 | MONK3Y | Y | Y | MZL |
| 1542 | BOB_JONES | - | Y | TWV |

FIG. 14

USING RECEIPTS TO CONTROL ASSIGNMENTS OF ITEMS OF CONTENT TO USERS

RELATED APPLICATION

The instant application is a continuation-in-part of, and hereby claims priority under 35 U.S.C. §120 to, pending U.S. patent application Ser. No. 13/728,457, which is titled "Assigning Electronically Purchased Items of Content to Users," by Jean-Pierre Ciudad et al., which was filed on 27 Dec. 2012. The instant application also claims priority to U.S. provisional patent application No. 61/730,897, which is titled "Assigning Electronically Purchased Items of Content to Users," by Jean-Pierre Ciudad et al., which was filed on 28 Nov. 2012. Both of these applications are incorporated by reference.

BACKGROUND

1. Field

The described embodiments relate to electronic devices. More specifically, the described embodiments relate to using receipts to control the assignment of items of content to users.

2. Related Art

In the last decade, it has become commonplace for individual users to use electronic devices such as personal computing devices and smart phones to electronically purchase items of content such as digitally-rendered books, music, or video and applications from content providers using electronic networks such as the Internet. As the technology behind electronically providing content matures and electronic devices become more ubiquitous, businesses and institutions have also begun to use the technology for supplying content to their employees, students, etc. For example, businesses can provide work-related applications to employees for use within the scope of their employment or schools can provide applications and digitally-rendered books for use by students.

However, because many content providers are configured to complete transactions with individual users, the mechanisms provided to enable purchasing entities (e.g., businesses, institutions, etc.) to purchase and assign/transfer items of content to users may not provide the level of control over the items of content that the purchasing entities desire. For example, one existing technique to enable a purchasing entity to provide an item of content to a user involves the purchasing entity purchasing a license for the item of content and receiving a token (e.g., a redemption code, a digital certificate, etc.) for the item of content from the content provider. Next, the purchasing entity forwards the token to the user to whom the item of content is to be assigned. The user then uses the token to complete a purchase transaction with the content provider through the user's personal account, after which the user "owns" the item of content outright. Because the user owns the item of content, the purchasing entity has no control over the user's use of the item of content. For example, assuming that the item of content is an application assigned to an employee by an employer, because the employee owns the application, the employee can freely use the application, even after the employee leaves employment with the employer.

SUMMARY

The described embodiments comprise an electronic device that executes an application, the electronic device including a processing subsystem. In these embodiments, the processing subsystem is configured to acquire a receipt associated with the application, wherein the application was purchased by a purchasing entity and installed on the electronic device after being assigned to a user of the electronic device by the purchasing entity. The processing subsystem is further configured to determine, using the receipt, if the application has expired. When the application has not expired, the processing subsystem is configured to execute the application with predetermined functions of the application enabled. When the application has expired, the processing subsystem is configured to execute the application with the predetermined functions of the application disabled.

In some embodiments, when determining, using the receipt, if the application has expired, the processing subsystem is configured to determine that the application has expired when the receipt comprises an expiration date and the expiration date has passed.

In some embodiments, the electronic device further comprises a display coupled to the processing subsystem. In these embodiments, when the receipt comprises both the expiration date and an indication that the assignment of the application to the user has been revoked and the expiration date has passed or is less than a threshold time away, the processing subsystem is configured to present a message on the display indicating that the assignment of the application to the user has been revoked and that application should be purchased to enable executing the application with the predetermined functions of the application enabled after the expiration date.

In some embodiments, the indication that the assignment of the application to the user has been revoked comprises a revocation reason. In these embodiments, when presenting the message on the display of the electronic device indicating that the assignment of the application to the user has been revoked, the processing subsystem is configured to arrange the message based on the revocation reason.

In some embodiments, the electronic device further comprises a display coupled to the processing subsystem. In these embodiments, when the receipt comprises the expiration date, but no indication that the assignment of the application to the user has been revoked and the expiration date has passed or is less than a threshold time away, the processing subsystem is configured to present a message on the display indicating that the electronic device should contact a content provider device to obtain an updated receipt with an extended expiration date to enable executing the application with the predetermined functions of the application enabled after the expiration date.

In some embodiments, when determining, using the receipt, if the application has expired, the processing subsystem is configured to determine that the application has expired when the receipt does not comprise an expiration date, but comprises an indication that the assignment of the application to the user has been revoked.

In some embodiments, the electronic device further comprises a display coupled to the processing subsystem. In these embodiments, when the receipt does not comprise the expiration date, but comprises the indication that the assignment of the application to the user has been revoked, the processing subsystem is configured to present a message on the display indicating that the assignment of the application to the user has been revoked and that application should be purchased to enable executing the application with the predetermined functions of the application enabled.

In some embodiments, when acquiring the receipt associated with the application on the electronic device, the processing subsystem is configured to attempt to acquire an updated receipt associated with the application on the electronic device from a content provider device. When the updated receipt is acquired from the content provider device, the processing subsystem is configured to use the updated receipt as the receipt. Otherwise, when the updated receipt is not acquired from the content provider device, the processing subsystem is configured to use a stored copy of a prior receipt associated with the application on the electronic device that was previously acquired from the content provider device as the receipt.

In some embodiments, when attempting to acquire the updated receipt from the content provider device, the processing subsystem is configured to send a request for the updated receipt to the content provider device using a preference order. In these embodiments, the preference order comprises: (1) during a first predetermined time, if the electronic device is receiving power from an external power supply and a preferred network is available, sending the request for the updated receipt to the content provider device using the preferred network; (2) after the first predetermined time, for a second predetermined time, if the preferred network is available, sending the request for the updated receipt to the content provider device using the preferred network, regardless of a source from which the electronic device receives power; and (3) after the second predetermined time, sending the request for the updated receipt to the content provider device using any available network, regardless of the source from which the electronic device receives power.

In some embodiments, the processing subsystem is configured to store a copy of the updated receipt when the updated receipt is acquired from the content provider device.

In some embodiments, the processing subsystem is configured to determine that the application was assigned to the user of the electronic device before attempting to acquire the updated receipt.

In some embodiments, the predetermined functions of the application comprise an updating function and an install function, so that the application cannot be updated or reinstalled on the electronic device after the application has expired.

In some embodiments, the predetermined functions of the application further comprise predetermined operational functions of the application, so that the application will not perform some or all operations of the application after the application has expired.

BRIEF DESCRIPTION OF THE FIGURES

FIG. 4 presents a block diagram illustrating an exemplary purchased list in a content provider device in accordance with the described embodiments.

FIG. 5 presents a block diagram illustrating an exemplary purchased list in an administrative device in accordance with the described embodiments.

FIG. 6 presents a block diagram illustrating an exemplary user-assignment table in an administrative device in accordance with the described embodiments.

FIG. 7 presents a block diagram illustrating an exemplary assignment message in accordance with the described embodiments.

FIG. 8 presents a block diagram illustrating an exemplary user-assignment table in a content provider device in accordance with the described embodiments.

FIG. 9 presents a block diagram illustrating an exemplary user identity message in accordance with the described embodiments.

FIG. 10 presents a block diagram illustrating an exemplary user-assignment table following an update of an entry for a user in accordance with the described embodiments.

FIG. 12 presents a block diagram illustrating an exemplary user-assignment table in an administrative device after the assignment of the application has been revoked from the user in accordance with the described embodiments.

FIG. 13 presents a block diagram illustrating an exemplary revocation message in accordance with the described embodiments.

FIG. 14 presents a block diagram illustrating an exemplary user-assignment table in a content provider device after the assignment of the application has been revoked from the user in accordance with the described embodiments.

Throughout the figures and the description, like reference numerals refer to the same figure elements.

DETAILED DESCRIPTION

Figure 1:
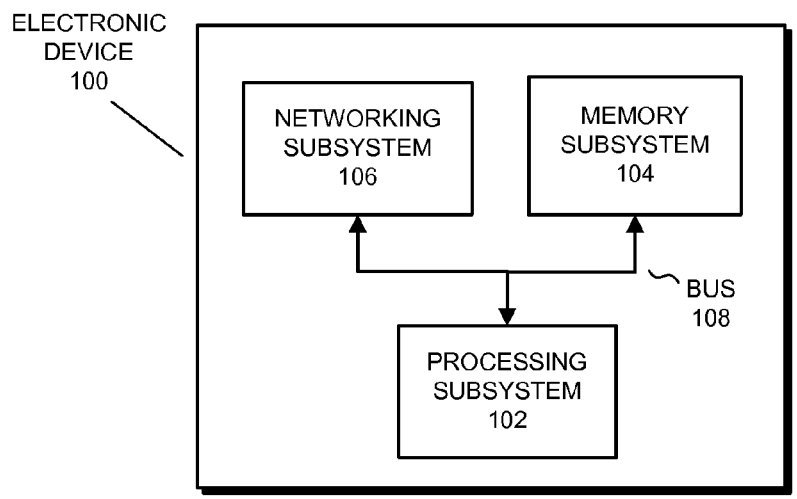
FIG. 1 presents a block diagram of an electronic device in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., electronic device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., electronic device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

Overview

The described embodiments include a content provider that enables the revocation of assignments of items of content (e.g., applications, digitally-encoded media files, etc.) to users using electronic receipts. In these embodiments, the content provider enables a purchasing entity (e.g., a business, an institution, a user, etc.) to electronically purchase one or more items of content and assign the items of content to one or more users. The items of content can then be electronically transferred to the users to which they are assigned. For example, an employer can perform a transaction with a content provider device (e.g., a server, etc.) of the content provider to purchase a number of copies of an item of content (e.g., a word processor application, an email application, a digitally-encoded media file, etc.) for use by its employees. Next, the employer can send one or more assignment messages to the content provider device to indicate employees to which the purchased items of content are assigned. The content provider device can then electronically transfer the item of content to the user's device. For example, the user can sign in to an account with the content provider and download the item of content to the user's device, the item of content can be automatically sent from the content provider device to the user's device, etc. In a similar way, an institution such as a school, church, business, or government agency can purchase items of content and assign them to one or more students, members, recipients, beneficiaries, and/or users. More generally, any user that can purchase items of content can purchase one or more items of content and can assign the purchased items of content to any user for subsequent electronic transfer to that user.

The described embodiments enable the purchasing entity to indicate to the content provider when one or more items of content are no longer assigned to one or more users. That is, when the assignment of one or more items of content is to be revoked. For example, the purchasing entity can send a revocation message to the content provider device that indicates that the assignment of one or more items of content is to be revoked. After an assignment of an item of content has been revoked, the content provider can limit various rights for the user with respect to the item of content. For example, when the item of content is an application, predetermined functions of the application can be disabled when the assignment of the application is revoked (the predetermined functions are described in more detail below).

In some embodiments, the content provider device provides receipts associated with, but separate from, items of content. Generally, a receipt serves two functions: (1) enable enforcing revocation of an assignment of an associated item of content; and (2) enabling preventing the evasion of enforcement of the revocation of the assignment of the associated item of content. To enable performing these functions, the receipt includes at least one of an expiration date and a revocation reason. For example, for the expiration date, the receipt may include an indication of a given day or time, and for the revocation reason, the receipt may include a code, a text string, and/or other indicator that indicates why the assignment of the item of content to the user of the user device is being revoked.

In cases where both an expiration date and revocation reason are included in the receipt, the receipt indicates to the user device that the assignment of the item of content to a user of the user device has been revoked. In this case, the expiration date represents a final time (e.g., day) during which the user will be able to use the item of content without contacting the content provider device to purchase a copy of the item of content. Prior to the expiration date, the user device handles the item of content normally. For example, when the item of content is an application, before the expiration date, the user device executes the application with predetermined functions of the application enabled. However, after the expiration date, the user device limits various rights for the user with respect to the item of content. For example, for an application, after the expiration date, the user device executes the application with the predetermined functions of the application disabled. As another example, after the expiration date, an operating system on the user device may prevent access to the application (i.e., prevent the application from launching). By using the combination of expiration date and revocation reason in the receipt as described, these embodiments assist with enforcing the revocation of the assignment of the item of content.

In cases where a revocation reason is included in the receipt, but no expiration date is included, the receipt indicates to the user device that the assignment of the item of content to a user of the user device is immediately revoked. Thus, the user device immediately limits various rights for the user with respect to the item of content. For example, for an application, the user device may execute the application with the predetermined functions of the application disabled or an operating system on the user device may prevent access to the application. By using the revocation reason in the receipt as described, these embodiments assist with enforcing the revocation of the assignment of the item of content.

In cases where the receipt includes an expiration date, but no revocation reason, the receipt indicates to the user device that the receipt itself is set to expire after the expiration date (i.e., the receipt does not indicate that the assignment of the item of content has been revoked). Similarly to the case described above, prior to the expiration date, the user device handles the item of content normally. However, after the expiration date, the user device limits various rights for the user with respect to the item of content. For example, for an application, after the expiration date, the user device executes the application with the predetermined functions of the application disabled or an operating system on the user device prevents access to the application. Because the receipt is only expiring, however, the user device can access the content provider device to acquire a new receipt with an extended expiration date to avoid expiration of the receipt. By causing the user device to access the content provider device to acquire the new receipt to avoid expiration of the receipt, these embodiments force user devices to periodically check for updated receipts. This enables the content provider device, upon the revocation of the assignment of the item of content by the purchasing entity, to timely provide a receipt that includes both the expiration date and the revocation reason (as described above). Thus, users are prevented from simply evading contact with the content provider device to avoid the user device being made aware of the revocation of the assignment of the item of content. These embodiments therefore assist with preventing the evasion of the enforcement of the revocation of the assignment of the item of content.

In some embodiments, an initial receipt is electronically transferred (e.g., downloaded) to the user device along with, but separately from, the item of content as the item of content is stored/installed on the user device. The initial receipt is stored in the user device in a designated location (e.g., directory) and used as described above until the receipt is nearing the expiration date for the receipt. Before the receipt expires, the user device (e.g., an operating system or application in the user device) accesses the content provider device to acquire a new receipt with an extended expiration date, replacing the initial receipt with the new receipt. This process continues indefinitely, with new receipts with extended expiration dates replacing existing/current receipts, until the assignment of the item of content is revoked or the item of content is uninstalled from the user device.

By assisting with enforcing the revocation of the assignment of the application and preventing the evasion of the enforcement of the revocation of the assignment of the application, the described embodiments enable purchasing entities to retain at least some control over items of content that have been assigned to users. This enhanced control over the items of content may, in turn, enable the wider adoption of volume purchases of items of content by purchasing entities (including larger purchasing entities such as educational institutions, businesses, etc.).

Electronic Device

FIG. 1 presents a block diagram illustrating an exemplary electronic device 100 in accordance with the described embodiments. Generally, electronic device 100 can be any electronic device with computing capabilities that can perform the operations herein described. As can be seen in FIG. 1, electronic device 100 includes processing subsystem 102, memory subsystem 104, and networking subsystem 106.

Processing subsystem 102 includes one or more devices, circuits, hardware modules, and/or computer-readable storage mediums configured for performing computational operations. For example, processing subsystem 102 can include, but is not limited to, one or more processors/processor cores, ASICs, microcontrollers, or programmable-logic devices.

Memory subsystem 104 includes one or more devices, circuits, hardware modules, and/or computer-readable storage mediums for storing code and/or data for use by processing subsystem 102 and/or other subsystems in electronic device 100, as well as for controlling access to the code and/or data. For example, memory subsystem 104 can include, but is not limited to, DRAM, flash memory, and/or other types of memory.

In some embodiments, memory subsystem 104 includes some or all of a memory hierarchy that comprises an arrangement of one or more caches coupled to a memory in electronic device 100. In these embodiments, one or more of the caches in the memory hierarchy can be located in processing subsystem 102. In addition, in some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can store more recently and/or frequently accessed code and/or data, while the mass-storage device stores less recently and/or less frequently accessed code and/or data.

Networking subsystem 106 can include one or more devices configured to couple to and communicate on a wired and/or wireless network (i.e., to perform network operations). For example, networking subsystem 106 can include, but is not limited to, a Bluetooth networking system (including support for the BTLE standard), a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad hoc network connection with other devices. In the following description, we refer to a subset of the mechanisms used for coupling to, communicating on, and handling data and events on the network at the physical layer of each network connection collectively as the "interface" for the corresponding network connection.

Bus 108 is coupled between processing subsystem 102, memory subsystem 104, and networking subsystem 106. Bus 108 comprises electrical, optical, and/or electro-optical connections used to communicate between processing subsystem 102, memory subsystem 104, networking subsystem 106. Note that bus 108 is presented for illustrative purposes, in alternative embodiments different numbers and/or arrangements of connections may be used.

Although shown as separate subsystems in FIG. 1, in some embodiments, some or all of a given subsystem can be integrated into one or more of the other subsystems in electronic device 100. For example, as described above, some or all of memory subsystem 104 can be included in processing subsystem 102.

Electronic device 100 can be, or can be incorporated into many different types of electronic devices. Generally, these electronic devices include any device that can perform the operations herein described. For example, electronic device 100 can be part of a desktop computer, a laptop computer, a server, a media player, an appliance, a subnotebook/netbook, a tablet computer, a smart phone, a network appliance, a set-top box, a toy, a controller, or another device.

Although specific components are used to describe electronic device 100, in some embodiments, different components and/or subsystems may be present in electronic device 100. For example, electronic device 100 may include one or more additional processing subsystems 102, memory subsystems 104, and/or networking subsystems 106. Alternatively, one or more of the subsystems may not be present in electronic device 100. Moreover, in some embodiments, electronic device 100 may include one or more additional subsystems that are not shown in FIG. 1. For example, electronic device 100 can include, but is not limited to, a display, a data collection subsystem, an audio subsystem, and/or an input/output (I/O) subsystem.

Figure 2:
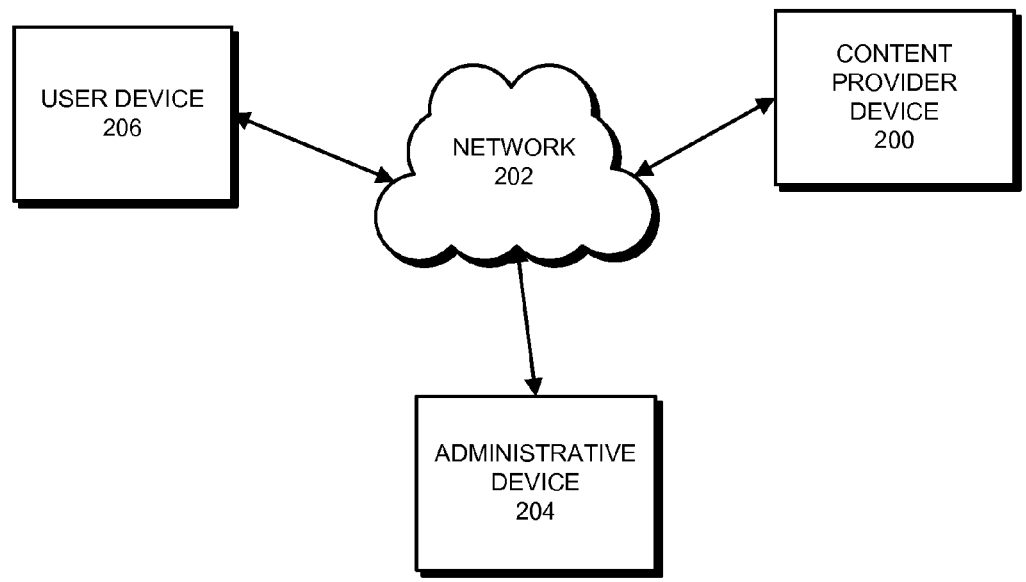
FIG. 2 presents a block diagram illustrating a content provider device coupled via a network to an administrative device and a user device in accordance with the described embodiments.

FIG. 2 presents a block diagram illustrating an exemplary content provider device 200 coupled via a network 202 to an administrative device 204 and a user device 206 in accordance with the described embodiments. Generally, content provider device 200, network 202, administrative device 204, and user device 206 are configured to perform the operations herein described.

Network 202 can be any wired or wireless network or combination of networks that enables content provider device 200, user device 206, and administrative device 204 to communicate with one another. For example, in some embodiments, network 202 comprises the Internet, possibly along with one or more of access points, local area networks, modems, routing hardware, etc. that can be used for content provider device 200, user device 206, and administrative device 204 to communicate with one another across the Internet. For instance, in some embodiments, network 202 comprises a local area network (e.g., a corporate local area network) that is communicatively coupled to the Internet, and user device 206 and administrative device 204 are coupled to the local area network and content provider device 200 is coupled to the Internet. In this embodiment, the devices can communicate with one another using the combination of the local area network and the Internet. In another embodiment, network 202 comprises a cellular network and a separate local area network that are communicatively coupled to the Internet, and user device 206 is coupled to cellular network, administrative device 204 is coupled to the local area network, and content provider device 200 is coupled to the Internet. In this embodiment, the devices can communicate with one another using the combination of the cellular network, the local area network, and the Internet.

In some embodiments, content provider device 200 is an electronic device that provides an electronic commerce ("e-commerce") store/site that can be used for purchasing, assigning, managing, and electronically transmitting items of content. In some embodiments, content provider device 200 is an electronic device such as electronic device 100 (with the attendant subsystems). For example, in some embodiments, content provider device 200 comprises at least one server computer system (and can, as a part of a computing "cloud," comprise multiple computer systems). In some embodiments, content provider device 200 provides an application store or "app store" such as the App Store from Apple, Inc. of Cupertino, Calif.

Administrative device 204 is an electronic device that provides an administrative user (e.g., a purchasing agent, an administrator, a manager, etc.) an interface (e.g., an application, a website, etc.) to the e-commerce store/site hosted by content provider device 200. The interface can be used for performing operations that can include purchasing items of content, assigning purchased items of content and revoking assignments of purchased items of content, administering/reviewing purchased and assigned items of content and other account details, and for performing other tasks to enable the operations herein described. In some embodiments, administrative device 204 is an electronic device such as electronic device 100 (with the attendant subsystems). For example, in some embodiments, administrative device 204 comprises a desktop computer system, a tablet computer, or a smart phone.

User device 206 is an electronic device that provides a user with an interface (e.g., an application, a website, etc.) to the e-commerce store/site hosted by content provider device 200. The interface can be used for performing operations that can include logging in to an account, communicating a user identity message, requesting and accepting an electronic transfer (e.g., download, email, manual transfer, etc.) of assigned items of content, administering/reviewing assigned items of content and other account details, and for performing other tasks to enable the operations herein described. In some embodiments, user device 206 is an electronic device such as electronic device 100

(with the attendant subsystems). For example, in some embodiments, user device 206 comprises a desktop computer system, a tablet computer, or a smart phone.

Although we show and describe content provider device 200, network 202, administrative device 204, and user device 206 in FIG. 2, in some embodiments, the devices may be in a different arrangement and/or may comprise a different number of devices. For example, in some embodiments, administrative device 204 is comprised of two devices: a first purchasing device and a second administrative device. In this embodiment, the purchasing device can be used by a purchasing agent to purchase one or more items of content and the administrative device can be separately used by an administrator to assign/revoke assignment of the purchased items of content. Generally, the described embodiments can comprise any arrangement of devices that can perform the operations herein described.

Items of Content

In the described embodiments, the items of content provided by content provider (via content provider device 200) can comprise any type of items of content that can be purchased by a purchasing entity (e.g., administrative user, a user, etc.) and assigned to a user. For example, items of content can include, but are not limited to, applications, digitally-encoded media files such as music, books/periodicals/writing, images, video, etc., ring tones, licensed content, digitally-encoded plans/specifications, and/or combinations of these.

In some embodiments, items of content can be electronically transferred using network 202 from content provider device 200 to user's device 206. In some embodiments, items of content can otherwise be transferred from a content provider to user's device 206 (e.g., manually transferred, sent via email or regular mail).

Assigning an Item of Content to a User

Figure 3:
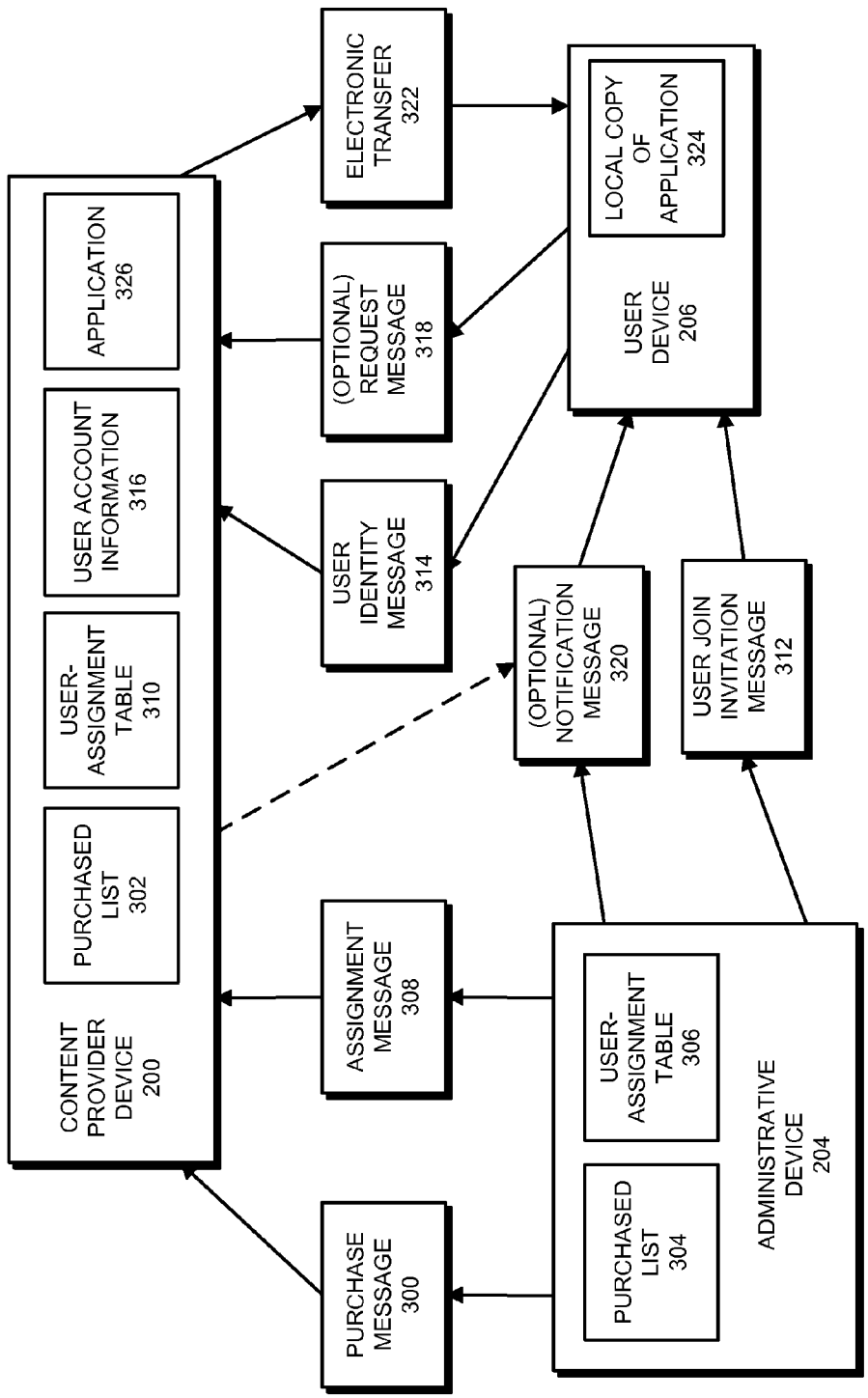
FIG. 3 presents a block diagram illustrating exemplary messages communicated between a content provider device, an administrative device, and a user device while assigning an item of content to a user in accordance with the described embodiments.

FIG. 3 presents a block diagram illustrating exemplary messages communicated between content provider device 200, administrative device 204, and user device 206 while assigning an item of content to a user in accordance with the described embodiments. In the example shown in FIG. 3, an application 326 is used as an exemplary item of content. However, as described above, the described embodiments are operative with any item of content that can be purchased and assigned to a user.

The messages shown in FIG. 3 can commence when administrative device 204, during a purchase transaction with content provider device 200, sends a purchase message 300 to content provider device 200 that indicates that an administrative user of administrative device 204 wishes to purchase a copy of application 326. For example, the administrative user of administrative device 204 can use the interface (e.g., application, website, etc.) to the e-commerce store/site hosted by content provider device 200 purchase a copy of a word processing application, a game application, a scientific computing application, etc from the content provider that operates content provider device 200. Purchase message 300 can comprise information regarding application 326, account information for the administrative user, remittance information, and other information useful for the purchase transaction.

Note that purchase message 300, along with the other messages shown in FIG. 3, can be formatted/arranged in accordance with a communication standard used for communicating between the sender (e.g., administrative device 204) and the receiver (e.g., content provider device 200). This can mean that each message can be configured as a payload in one or more packets/data units/frames that are transmitted across network 202 from the sender to the receiver. The arrangement of packets for transmission between devices is generally known in the art and hence is not described in detail.

In response to purchase message 300, content provider device 200 can complete the purchase transaction for application 326. At the conclusion of the purchase transaction (which can involve operations such as verifying the form of payment, sending a receipt, etc.), content provider device 200 can add application 326 to purchased list 302 associated with the administrative user's account. Purchased list 302 can be, for example, a listing in a file, a data structure, a variable in memory, etc., that includes a listing of each item of content purchased by the administrative user along with a number of the item of content that remain available for assignment. Thus, after the above-described purchase transaction is complete, purchased list 302 comprises a listing of application 326 and a value that indicates that at least one copy of application 326 is available for assignment.

FIG. 4 presents a block diagram illustrating an exemplary purchased list 302 in accordance with the described embodiments. As can be seen, purchased list 302 comprises a listing of account information 406 for the administrative user's account, a listing of each item of content 400 along with a number 402 of the items of content that remain available for assignment ("NFA"), and other data 404 relevant to the listing. In the example shown in FIG. 4, the items of content include an ebook (a digitally-rendered book), application 326, a word processor application, and a media file (an educational movie). For these items of content, there are 3, 1, 4, and 5 available to assign, respectively. Data 404 for these items in the figure is simply illustrative, but in an actual embodiment, data 404 can comprise any useful data (e.g., item of content identifiers, numbers of items of content previously purchased, date items of content were purchased, license status, item of content information, etc.) and can be organized as multiple separate fields for each entry.

In some embodiments, administrative device 204 maintains a local copy of purchased list 302 that an administrative user can view in the interface (e.g., application, website, etc.) to the e-commerce store/site hosted by content provider device 200 (or can otherwise view) to review purchased items of content that are available for assignment. The local copy of purchased list 302 is shown in administrative device 204 in FIG. 3 as purchased list 304. In these embodiments, after the purchase transaction is complete, administrative device 204 can update purchased list 304 to reflect the purchase of application 326. FIG. 5 presents a block diagram illustrating an exemplary purchased list 304 in accordance with the described embodiments. As can be seen, purchased list 304 comprises a listing of each item of content 500 along with a number 502 of the items of content that remain available for assignment ("NFA"), and other data 504 relevant to the listing. In the example shown in FIG. 5, purchased list 304 has similar listings to purchased list 302 (because the purchase transaction has been completed), so that the items of content include an ebook, application 326, the word processor application, and the media file. For these items of content 500, there are 3, 1, 4, and 5 available to assign, respectively. Data 504 for these items in the figure is simply illustrative, but in an actual embodiment, data 504 can comprise any useful data (e.g., e.g., item of content identifiers, numbers of items of content previously purchased, date items of content were purchased, license status, item of content information, etc.) and can be organized as multiple separate fields for each entry. Depending on the implementation, purchased list 304 may also include account information similar to account information 406 in purchased list 302.

After the purchase transaction is completed, the administrative user, as part of an assignment transaction, can use the interface on administrative device 204 to review purchased list 304 and can perform an assignment operation in the interface to assign application 326 to a desired user. More specifically, using the interface the administrative user can perform one or more operations to instruct administrative device 204 that application 326 listed in the purchased list 304 is to be assigned to a user that is identified using a first identifier. In response, administrative device 204 can update an entry (i.e., make a new entry for the user or update an existing entry for the user) in user-assignment table 306 so that the updated entry lists the user by the first identifier for the user, as well as listing application 326 as being assigned to the user. FIG. 6 presents a block diagram illustrating an exemplary user-assignment table 306 in administrative device 204 in accordance with the described embodiments. As can be seen in FIG. 6, user assignment table 306 comprises a column for user ids 600, two columns for items of content, and a column for data 606. Each entry in the column of user ids 600 comprises a first identifier for the user for which the entry contains information (shown in FIG. 6 using an illustrative 4-digit number). As described above, the first identifier for the user can include any identifier used by an administrative user to distinguish one user from another. For example, the first identifier can be an employee or student id, a membership number, some or all of the user's name, etc. The columns for items of content include the exemplary items of content app 326 and ebook 604. These columns includes records of the assignment of a corresponding item of content (where app 326 can be the same as application 326 in purchased list 304 and ebook 604 can be the same "ebook" in purchased list 304). In the columns below app 326 and app 604, a "-" entry represents an item of content that has not been assigned to a corresponding user, a "R" entry represents an item of content for which a previous assignment has been revoked, and a "Y" entry represents an item of content that is assigned to the corresponding user. Data 606 for these items in the figure is illustrative, but in an actual embodiment, data 606 can comprise any useful data (e.g., user name/address/information, numbers of given items of content previously assigned, dates the items of content were assigned, item of content license status, item of content identifiers/information, etc.) and can be organized as multiple separate fields for each entry.

Note that the "R," or revoked, state shown in FIG. 6 and the other figures may not be used in some embodiments. For example, some embodiments may use the "-" or not-assigned, state in places where the revoked state is shown in FIG. 6 and the other figures.

In addition, as part of the assignment transaction, after the administrative user instructs administrative device 204 that application 326 listed in the purchased list 304 is to be assigned to the user, administrative device 204 sends assignment message 308 to content provider device 200 to inform content provider device that application 326 is to be assigned to the user. FIG. 7 presents a block diagram illustrating an exemplary assignment message 308 in accordance with the described embodiments. Assignment message 308 comprises a user identifier (user ID) 700, an item of content (IOC) 702 listing, an assigned/revoked (A/R) 704 indicator, and data 706. Assignment message 308 sent from administrative device 204 includes the first identifier for the user in user ID 700 (shown by the exemplary string "1063" in FIG. 7), an identifier for application 326 in IOC 702 (shown by the exemplary string "APP 326" in FIG. 7), an indication that application 326 is being assigned in A/R 704 (shown by the exemplary string "A" in FIG. 7), and any other relevant data in data 706 (e.g., number previously purchased, date purchased, license status, item information, etc.), which is illustrated using the exemplary string "WDJ."

Upon receiving and processing assignment message 308, content provider device 200 can update an entry (i.e., make a new entry for the user or update an existing entry for the user) in user-assignment table 310 so that the updated entry lists the user by the first identifier for the user, as well as listing application 326 as being assigned to the user. FIG. 8 presents a block diagram illustrating an exemplary user-assignment table 310 from content provider device 200 in accordance with the described embodiments. As can be seen in FIG. 8, user assignment table 310 comprises a column for a first identifier for the user (first ID) 800, column for a second identifier for the user (second ID) 802, two columns for items of content, and a column for data 808. Each entry in the column of first IDs 800 comprises a first identifier for the user for which the entry contains information (shown in FIG. 8 using an illustrative 4-digit number). Each entry in the column of second IDs 802 comprises a second identifier for the user. The columns for items of content include the exemplary items of content app 326 and ebook 802. These columns include records of the assignment of a corresponding item of content (where app 326 can be the same as application 326 in purchased list 302 and ebook 806 can be the same "ebook" in purchased list 302). The meanings of the various values in the columns below app 326 and ebook 806 are described above in the description of user-assignment table 306. Data 808 for these items in the figure is simply illustrative, but in an actual embodiment, data 808 can comprise any useful data (e.g., number previously assigned, date assigned, license status, item information, etc.) and can be organized as multiple separate fields for each entry.

Note that, although FIG. 8 shows a single user-assignment table 310, in some embodiments, more than one table can be used. For example, in some embodiments, a separate table maps first ID 800 to second ID 802, and a second table maps second ID 802 to assigned items of content. Generally, any arrangement of tables can be used to perform the operations herein described, and are collectively referred to herein as a "user-assignment table." Additionally, in some embodiments, user-assignment table 306 maintained by administrative device 204 is a local copy of user-assignment table 310 that an administrative user can view in the interface (e.g., application, website, etc.) to the e-commerce store/site hosted by content provider device 200 (or can otherwise view) to review the assignments of items of content.

As can be seen in FIG. 8, second ID 802 for the user to which application 326 is being assigned, and whose first ID 800 is "1063," is blank in user-assignment table 310. FIG. 8 is shown this way to illustrate that, in some embodiments, the administrative user may not know the user's second ID 802 (which can be, e.g., a login name, a nickname, etc. known to the content provider). Hence, even though content provider device 200 is able to fill in most of the remaining values in the entry from the information in the assignment message, second ID 802 (and perhaps some or all of data 808) may not be filled until the user sends a message to the content provider to inform the content provider of the mapping/relationship between first ID 800 for the user and second ID 802. Once the user informs the content provider of the mapping/relationship between first ID 800 for the user and second ID 802, content provider device 200 can fill in second ID 802 in the entry for the user (and may also be able to fill in some or all of data 808 based on information associated with the user that can be accessed using second ID 802).

In some embodiments, in order to fill the second ID 802 entry in the user-assignment table 310, the administrative user can, either before or after sending assignment message 308, instruct administrative device 204 to send a user join invitation message 312 to user device 206 (or can otherwise inform the user of the information in the user join invitation message 312). User join invitation message 312 comprises an indication that the user should inform the content provider of a relationship/mapping between the first identifier for the user and the second identifier for the user (i.e., inform the content provider of a second identifier for the user that can be associated with the first identifier for the user).

In response to the user join invitation message 312, the user can use the interface (e.g., application, website, etc.) to the e-commerce store/site hosted by content provider device 200 on user device 206 to send a user identity message 314 to content provider device 200. FIG. 9 presents a block diagram illustrating an exemplary user identity message 314 in accordance with the described embodiments. As can be seen in FIG. 9, user identity message 314 comprises a first identifier (first ID) 900, a second identifier (second ID) 902, and data 904. First ID 900 comprises the first identifier for the user and second ID 902 comprises the second identifier for the user. Data 904 in the figure is simply illustrative, but in an actual embodiment, data 904 can comprise any data useful for the user identity message and can be organized as multiple separate fields.

Content provider device 200, upon receiving user identity message 314, can use information from user identity message 314 to update second ID 802 in an entry for the user in user-assignment table 310. For example, content provider device 200 can use first ID 900 for the user to find a matching first ID 800 in user-assignment table 310, and can update the corresponding entry with second ID 902. FIG. 10 presents a block diagram illustrating an exemplary user-assignment table 310 following the update of the entry for the user in accordance with the described embodiments. As can be seen in FIG. 10, the entry for the user (whose first ID 800 is "1063") in user-assignment table 310 has been updated so that second ID 802 is set to the exemplary user login name "BIGBOY99." Note that exemplary data 808 has also been updated to the string "FPX" illustrate that content provider device 200 may update the data associated with the entry based on the second ID 802 (which may give content provider device 200 insight into user account details, etc.).

Note that, in some embodiments, content provider device 200 may perform one or more authentication operations before using the user identity message 314 to update user-assignment table 310. For example, in some embodiments, an authentication process comprises administrative device 204 transferring some kind of a secret (e.g., a digital certificate, a password, a nonce, etc.) to content provider device 200. Content provider device 200 can then store the secret with an indication that the secret is associated with the administrative device 204. Administrative device 204 can then also transfer the secret to one or more authorized user devices 206. In these embodiments, user device 206 sends the secret along with the user identity message 314 (or during a separate authentication step (not shown)), and content provider device 200 compares the secret to the stored secret as an authentication step before allowing the use of the user identity message 314 to update user-assignment table 310. In some embodiments, the secret is unique to a particular scope of use, e.g., a given transaction, time/date range, and/or user device and may expire or be invalidated outside that scope. In some embodiments, the secret can be a general secret that is used for authenticating all user devices 206 associated with administrative device 204.

In some embodiments, after completing the assignment transaction and the user identity transaction (which comprises user join invitation message 312 and user identity message 314), content provider device 200 can update user account information 316 to comprise an indication that application 326 has been assigned to the user. For example, in some embodiments, content provider device 200 can update a record of purchased or assigned applications in the user's account to include application 326. In these embodiments, the application may be presented in the interface to the e-commerce store/site hosted by content provider device 200 on user device 206 in a similar way as applications previously purchased by the user for personal use. Using the interface on user device 206, the user can review the record of purchased or assigned applications. After reviewing the record of purchased or assigned applications (and seeing application 326 listed therein), the user can send request message 318 to content provider device 200 from user device 206 to electronically transfer 322 (e.g., download) application 326 from content provider device 200.

In some embodiments, after completing the assignment transaction and the user identity transaction, administrative device 204 and/or content provider device 200 can send a notification message 320 to user device 206 to inform the user of the assignment of application 326 to the user. Generally, notification message 320 can comprise any arrangement and/or type of information sufficient to convey to the user that application 326 has been assigned. For example, notification message 320 can be a push message sent to user device 206, an email, etc. that includes information about assigned application 326. In these embodiments, upon receiving notification message 320, using user device 206, the user can review the record of purchased or assigned applications using the interface to the e-commerce store/site hosted by content provider device 200. After reviewing the record of purchased or assigned applications, the user can send request message 318 to content provider device 200 from user device 206 to electronically transfer 322 (e.g., download) application 326 from content provider device 200. In these embodiments, because notification message 320 is sent to the user, the user may know more quickly that application 326 has been assigned and hence is available for electronic transfer.

Note that request message 318 is marked as "optional" in FIG. 3. In some embodiments, the user may not be required to send request message 318. For example, the user can configure user account settings so that items of content, upon assignment, are downloaded to user device 206 automatically (e.g., the next time that user device 206 is synched, plugged in to a wall power outlet, is idle, and/or meets one or more additional qualifications for automatic download).

After downloading, a local copy of the application 324 can be installed and otherwise made available for use on user device 206. As described below, in some embodiments, some or all of the functions (as well as the install itself) of application 326 can be controlled by the administrative user.

Although a number of messages is shown and described above, the messages are simplified for illustrating exemplary operations that may be performed by the described embodiments. In some embodiments, the messages communicated between the devices are different in number or arrangement. For example, in some embodiments, any of the messages may actually be comprised of multiple separate messages between a sender and a receiver of the message (e.g., requests, responses, control communications, acknowledgements, denials, resends, etc.). As another example, messages not shown in FIG. 3 may be used to enable a given transaction (e.g., the purchase transaction, the assignment transaction, etc.), including messages communicated to one or more devices (e.g., authentication devices, etc.) that are not shown in FIG. 3. Generally, any number of messages (or sub-messages) may be communicated to enable the operations herein described. As a yet another example, some or all of the messages may contain more information such as message type information, sender/receiver information, error checking codes, timestamps, etc.

Although various records (e.g., purchased list 302, user-assignment table 306, user-assignment table 310, etc.) are described with respect to FIG. 3, alternative embodiments include different numbers, types, or formats of the records. For example, in some embodiments, purchased list 302 and user-assignment table 310 maintained by content provider device 200 can be part of a single data structure associated with an account for the administrative user of administrative device 204. As another example, user-assignment table 306 and user-assignment table 310 can include any number of columns listing individual items of content. Generally, any form of records can be maintained by any of the devices that enables the operations herein described.

Revoking an Item of Content that is Assigned to a User

Figure 11:
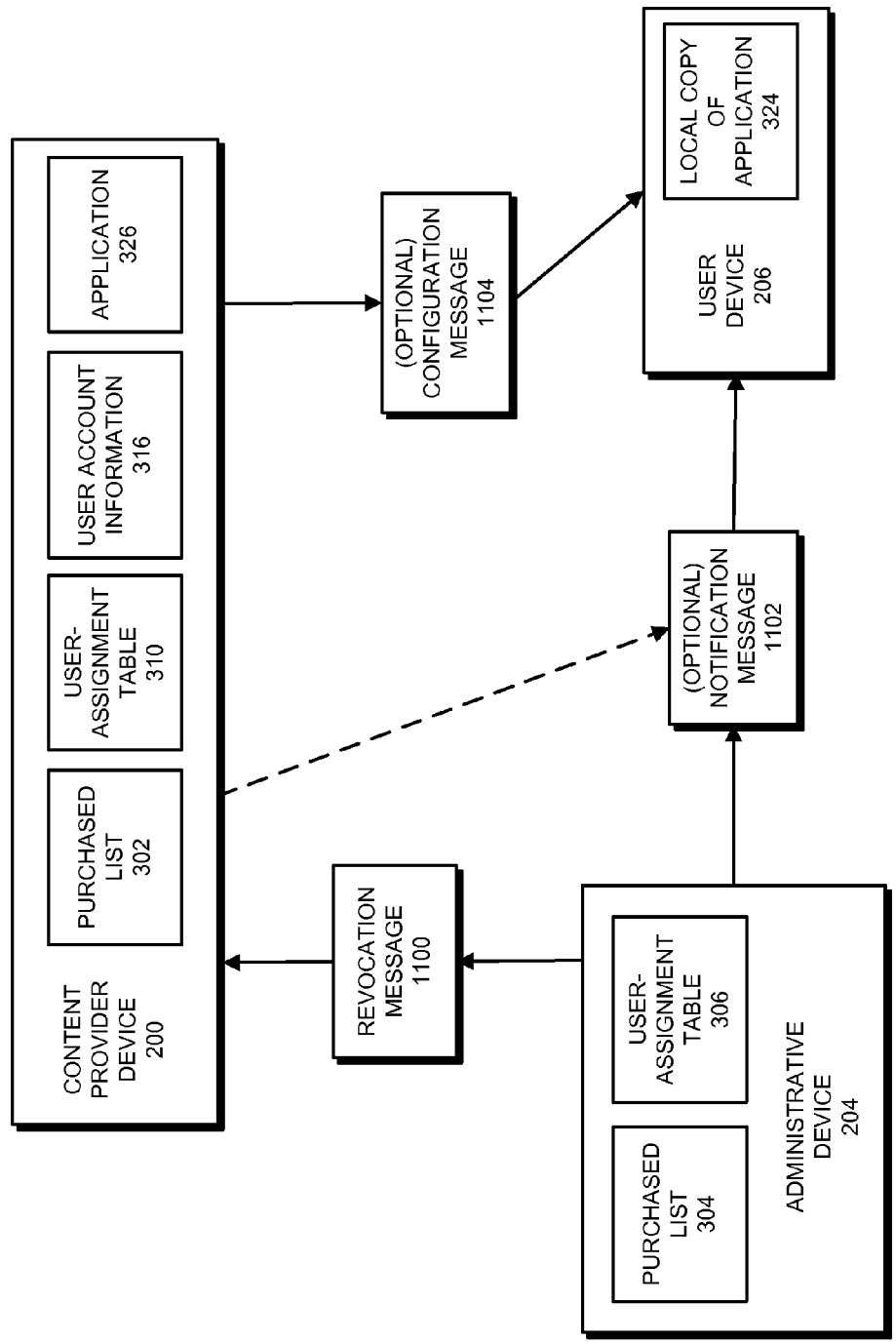
FIG. 11 presents a block diagram illustrating exemplary messages communicated between a content provider device, an administrative device, and a user device while revoking the assignment of application to a user in accordance with the described embodiments.

FIG. 11 presents a block diagram illustrating exemplary messages communicated between content provider device 200, administrative device 204, and user device 206 while revoking the assignment of application 326 to the above-described user in accordance with the described embodiments. In the example shown in FIG. 11, application 326 is used as an exemplary item of content. However, as described above, the described embodiments are operative with any item of content that can be purchased and assigned to a user.

The messages shown in FIG. 11 can commence when an administrative user of administrative device 204, as part of an assignment revocation transaction, uses the interface on administrative device 204 to review user-assignment table 306 and perform an assignment revocation operation to revoke the assignment of application 326 from the user (which is assumed to have previously been assigned to the user, e.g., as described above with respect to FIGS. 3-10). More specifically, using the interface, the administrative user can perform one or more operations to instruct administrative device 204 that the assignment of application 326, which is listed in user-assignment table 306 as being assigned to the user, is to be revoked from the user. In response, administrative device 204 can update the entry for the user in user-assignment table 306 so that the updated entry, which lists the user by the first identifier for the user, lists the assignment of application 326 as having been revoked from the user. Alternatively, administrative device 204 can remove or otherwise disable/invalidate the entry for the user in user-assignment table 306. FIG. 12 presents a block diagram illustrating an exemplary user-assignment table 306 after the assignment of the application has been revoked from the user in accordance with the described embodiments. As can be seen, and in contrast to the same entry in user-assignment table 306 shown in FIG. 6, the listing for the user (identified as "1063") indicates that the assignment has been revoked (shown using the letter "R" in the entry).

As part of the assignment revocation transaction, after the administrative user instructs administrative device 204 that the assignment of application 326 is to be revoked from the user, administrative device 204 sends revocation message 1100 to content provider device 200 to inform content provider device that the assignment of application 326 is to be revoked from the user. FIG. 13 presents a block diagram illustrating an exemplary revocation message 1100 in accordance with the described embodiments. Revocation message 1100 sent from administrative device 204 includes the first identifier for the user in user ID 700 (shown by the exemplary string "1063" in FIG. 11), an identifier for application 326 in IOC 702 (shown by the exemplary string "APP 326" in FIG. 11), an indication that the assignment of application 326 is being revoked in A/R 704 (shown by the exemplary string "R" in FIG. 11), and any other relevant data in data 706 (e.g., number previously purchased, date purchased, license status, item information, etc.), which is illustrated using the exemplary string "PKC."

Note that revocation message 1100, along with the other messages shown in FIG. 11, can be formatted/arranged in accordance with a communication standard used for communicating between the sender (e.g., administrative device 204) and the receiver (e.g., content provider device 200). This can mean that each message can be configured as a payload in one or more packets/data units/frames that are transmitted across network 202 from the sender to the receiver. The arrangement of packets for transmission between devices is generally known in the art and hence is not described in detail.

Assuming that application 326 can be reassigned following the assignment revocation transaction, as part of the assignment revocation transaction, administrative device 204 can update purchased list 304 to show that the revoked copy of application 326 is now available for assignment to a user. This can include updating an indicator for an existing entry in purchased list 304 to indicate that the copy of application 326 is available for assignment.

Upon receiving and processing revocation message 1100, content provider device 200 can update an entry in user-assignment table 310 so that the updated entry lists the assignment of application 326 as having been revoked from the user. FIG. 14 presents a block diagram illustrating an exemplary user-assignment table 310 after the assignment of the application has been revoked from the user in accordance with the described embodiments. As can be seen, and in contrast to the same entry in user-assignment table 310 shown in FIG. 10, the listing for the user (identified as "1063") indicates that the assignment has been revoked (shown using the letter "R" in the entry). As described above, the use of the "R," or revoked, state may be replaced by the use of the "-," or not-assigned, state in some embodiments.

Assuming that application 326 can be reassigned following the assignment revocation transaction, as part of the assignment revocation transaction, content provider device 200 can update purchased list 302 to show that the revoked copy of application 326 is now available for assignment to a user. This can include updating an indicator for an existing entry in purchased list 302 to indicate that the copy of application 326 is available for assignment.

In some embodiments, after completing the assignment revocation transaction, administrative device 204 and/or content provider device 200 can send a notification message 1102 to user device 206 to inform the user of the revocation of the assignment of application 326. Generally, notification message 1102 comprises any arrangement and/or type of information sufficient to convey to the user that the assignment of application 326 has been revoked. For example, notification message 1102 can be a push message sent to user device 206, an email, etc. that includes information about the revocation of the assignment of application 326 to the user.

In some embodiments, upon receiving revocation message 1100, content provider device 200 can send one or more configuration messages 1104 to user device 206 to disable or block features of and/or uninstall some or all of local copy of application 324. In some of these embodiments, a user of user device 206 can have previously agreed to remote management of the local copy of application 324 on user device 206; thereby enabling such operations. However, in alternative embodiments, content provider device 200 is unable to perform operations on local copy of application 324 on user device 206, and instead performs operations to block future electronic transfers of the item of content from content provider device 200 to user device 206 and/or not providing content-provider services related to the item of content (which is described in more detail below).

Although a number of messages is shown and described above, the messages are simplified for illustrating exemplary operations that may be performed by the described embodiments. In some embodiments, the messages communicated between the devices are different in number or arrangement. For example, in some embodiments, any of the messages may actually be comprised of multiple separate messages between a sender and a receiver of the message (e.g., requests, responses, control communications, acknowledgements, denials, resends, etc.). As another example, messages not shown in FIG. 11 may be used to enable a given transaction (e.g., the purchase transaction, the assignment transaction, etc.), including messages communicated to one or more devices (e.g., authentication devices, etc.) that are not shown in FIG. 11. Generally, any number of messages (or sub-messages) may be communicated to enable the operations herein described. As a yet another example, some or all of the messages may contain more information such as message type information, sender/receiver information, error checking codes, timestamps, etc.

Although various records (e.g., purchased list 302, user-assignment table 306, user-assignment table 310, etc.) are described with respect to FIG. 11, alternative embodiments include a different numbers, types, or formats of the records. For example, in some embodiments, purchased list 302 and user-assignment table 310 maintained by content provider device 200 can be part of a single data structure associated with an account for the administrative user of administrative device 204. As another example, user-assignment table 306 and user-assignment table 310 can include any number of columns listing individual items of content. Generally, any form of records can be maintained by any of the devices that enables the operations herein described.

Assigning Items of Content to and Revoking Items of Content from Multiple Users

The examples shown in FIGS. 3-14 describe an embodiment where a single item of content (application 326) is assigned to a single user (in FIGS. 3-10) and then revoked from the same user (in FIGS. 11-14). However, in the described embodiments, the assignment of content items to and the revocation of content items from users occurs on a larger scale (and, in some cases, on a significantly larger scale). More specifically, in some embodiments, the administrative user purchases two or more items of content (e.g., 2 copies of an application, 3 copies of a first application and 5 copies of a second application, 12 copies of a digitally-rendered movie, or 300 copies of a digitally-rendered book, etc.), assigns the two or more items of content to one or more users, and subsequently revokes one or more of the assignments of the items of content from given users.

For example, an administrative user in a corporation can purchase 50 copies of a first application (e.g., a word processor application) and 30 copies of a second application (e.g., a scientific computing application) from the content provider. The administrative user can then instruct the content provider that 30 copies of the first application are to be assigned to 30 employees designated by the administrative user (e.g., employees within a given department of the corporation, managerial employees, etc.), and 25 copies of the second application are to be assigned to 25 employees designated by the administrative user. (In this example, depending on how the administrative user wishes to assign applications, some of the employees can be assigned copies of both the first and second applications.) The employees can then electronically transfer the assigned copy(ies) of the first and/or second applications from the content provider to corresponding user devices. At a subsequent time, the administrative user can revoke the assignment of one or more copies of the first and/or second applications from given employees (e.g., when the employee quits, changes job functions, no longer needs the application, is terminated, etc.).

Accordingly, in some embodiments, the messages and records shown in FIGS. 3-14 can be configured to include the additional information used to enable an administrative user to make assignments to multiple users and revoke assignments from multiple users. For example, purchased lists 302 and 304 can include more entries to enable keeping records for more items of content, and user assignment tables 306 and 310 can include more entries to enable keeping records for more users and can include more columns for items of content. As another example, assignment message 308 and revocation message 1100 can include more entries to enable the assignment/revocation messages to carry information about assignments to multiple users and/or revocation of assignment from multiple users from administrative device 204 to content provider device 200.

Note that the described embodiments can be scaled to enable an administrative user to purchase any reasonable number of items of content (e.g., applications for students, etc.) and easily—using the above-described interface—perform assignments and revocations, sometimes for large groups of users (e.g., students in a class, employees in a department, etc.) at the same time. For example, in some embodiments, the administrative user can simply select a group of items of content in the interface, and can then select a group of users to which the items of content are to be assigned. The system can then undertake the underlying operations (as described for the single user in FIGS. 3-14) for the group of users.

Controlling Users' Rights to Items of Content

As indicated above, in the described embodiments, administrative users retain at least some control over items of content that are installed on user's devices. Specifically, administrative users can revoke assignments of items of content, thereby leading to at least some loss of rights for the user with regard to the item of content. The loss of rights for the user with regard to an item of content can be manifested in various ways, depending on the nature of the item of content and amount of control that the administrative user is given over items of content on a user's device.

In some embodiments, the administrative user does not have control over items of content that are already installed on user's devices. In these embodiments, therefore, despite revoking the assignment of an item of content, the administrative user generally cannot cause a user's device to perform operations on an item of content (e.g., uninstall/delete, block/disable, etc.). Hence, the administrative user can be limited to causing the content provider to perform operations such as blocking future electronic transfers of the item of content to the user's device and/or not providing content-provider services related to the item of content. The content-provider services can comprise any services related to the item of content, including updating/upgrading, support, online/dynamic features, re-installing/re-downloading (a lost or corrupted item of content) and/or other content-provider services associated with the item of content. For example, assuming that the assigned item of content is an application that has been installed on a user's device, following the revocation of the assignment by the administrative user, the application may remain on the user's device and may remain at least partially functional, but the content provider can stop providing: online features of the application, updates/upgrades to the application, reinstallation of the application, application-related information (e.g., calendar updates, dynamically-generated content, push messages, etc.) to the application, etc.

In embodiments where the administrative user does not have control over items of content that are already installed on user's devices, the revocation of the assignment of an item of content can cause any of a number of different indications to the user that the assignment has been revoked. For example, content provider device 200 and/or administrative device 204 can send notification message 1102 (e.g., an email, a push message, etc.) that indicates that the assignment of the item of content has been revoked, and thus the user has lost the corresponding rights to the item of content. As another example, content provider device 200 can update user account information 316 to indicate that the assignment has been revoked. For instance, user account information 316 may comprise a list of items of content that are available for electronic transfer to the user's device and/or for which the content provider will provide services. In these embodiments, the user can access and review user account information 316 using the interface (e.g., application, website, etc.) to the e-commerce store/site hosted by content provider device 200 that is presented by user device 206. In the list, items of content for which an assignment have been revoked may be presented with an indication that rights have been revoked and/or that the user can restore some or all of the revoked rights to the item of content by purchasing a personal copy of the item of content.

In some embodiments, the administrative user may have been granted at least some control over items of content that are already installed on user devices. For example, user device 206 can communicate one or more messages (e.g., within request message 318, etc.) to content provider device 200 that include an indication that one or more items of content that have been assigned to the user can be controlled by content provider device 200 (e.g., at the request of the administrative user). As another example, user account information 316 may include information that indicates that any items that meet a given set of qualifications (e.g., appearing in user-assignment table 310, being assigned to the user by a third party, etc.) can be controlled by content provider device 200 (e.g., at the request of the administrative user). In these embodiments, upon receiving revocation message 1100 revoking the assignment of an item of content, content provider device 200 can cause user device 206 to perform corresponding operations on the item of content (e.g., uninstall, delete, disable, etc.). As described below, this can involve sending an updated receipt to user device 206 with a revocation reason (with or without an expiration date).

In embodiments where items of content on a user's device 206 are acted on by content provider device 200 following the revocation of the assignment, at least one of content provider device 200 and the administrative device 204 can send any of a number of different indications to the user that the assignment has been revoked. For example, content provider device 200 and/or administrative device 204 can send notification message 1102 indicating that the assignment of the item of content has been revoked, along with an indication of the action to be taken on the item of content, and possibly an indication of options for the user to avoid the action and/or reverse the action (e.g., a deadline by which the user can purchase the item of content to avoid deletion/disabling, etc.). As another example, content provider device 200 can update user account information 316 to indicate that the assignment has been revoked and hence the item was acted upon on the user's device. For instance, user account information 316 may comprise a list of items of content that are available for electronic transfer to the user's device. In these embodiments, the user can access and review user account information 316 using the interface (e.g., application, website, etc.) to the e-commerce store/site hosted by content provider device 200 that is presented by user device 206. In the list, items of content for which an assignment have been revoked may be presented with an indication that the assignment of the item of content has been revoked, along with an indication of the action to be taken on the item of content, and possibly an indication of options for the user to avoid the action and/or reverse the action (e.g., a deadline by which the user can purchase the item of content to avoid deletion/disabling, etc.).

In some embodiments, a user's device 206 can include mechanisms for partially or completely disabling and/or blocking access to an item of content on the user's device 206. For example, the user's device can include one or more tokens, code libraries, certificates, timer values, receipts, etc. that are incorporated in and/or associated with an item of content that has been assigned to the user. In these embodiments, when an assignment has been revoked, the mechanism(s) can be activated or otherwise used to limit the user's rights with respect to the item of content. For example, assuming that the item of content is associated with a timer value, the user's device 206 could check the timer value before allowing the user to access/use the item of content (or some feature of the item of content). When the timer expires, the user's device 206 may need to contact content provider device 200 to get the timer reset. When the assignment of the item of content has been revoked, the content provider device 200 could refuse to reset the timer.

Figure 15:
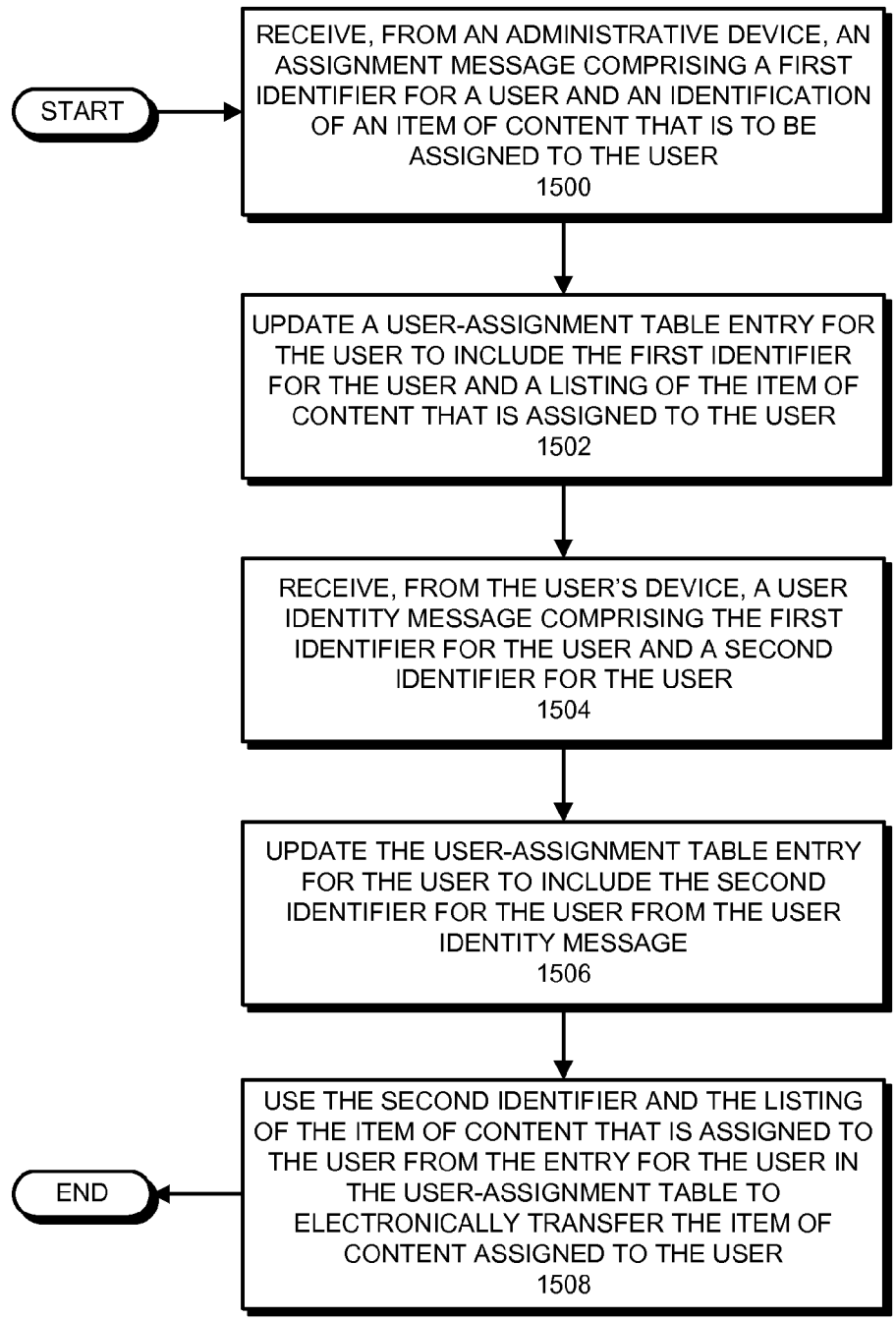
FIG. 15 presents a flowchart illustrating a process for assigning an item of content to a user in accordance with the described embodiments.

Processes for Handling the Assignment and Revocation of Assignment of Items of Content FIG. 15 presents a flowchart illustrating a process for assigning an item of content in accordance with the described embodiments. In the example shown in FIG. 15, an administrative user assigns a single user an item of content. However, as described above, the described embodiments function similarly in cases where the administrative user assigns two or more users two or more items of content. In addition, although certain operations in FIG. 15 are presented in a given order as an illustration of some embodiments, alternative embodiments include a different number of operations and/or perform the operations in a different order. Generally, any number of operations can be performed that enable the assignment of an item of content to a user such as herein described.

The process shown in FIG. 15 starts when content provider device 200 receives, from administrative device 204, an assignment message 308 comprising a first identifier for a user and an identification of an item of content that is to be assigned to the user (step 1500). For example, assuming that the item of content is a copy of a digitally-rendered book and that the administrative user is a pastor at a church who is assigning a copy of the digitally-rendered book to a member of the church, content provider device 200 can receive, from administrative device 204 operated by the pastor, an assignment message 308 comprising a first identifier for a member of the church (e.g., a member name or number) and an identification of the digitally-rendered book that is to be assigned to the user.

Content provider device 200 then updates a user-assignment table 310 entry for the user to include the first identifier for the user and a listing of the item of content that is assigned to the user (step 1502). Continuing the example above, this operation comprises using information from the assignment message 308 to update an entry in user-assignment table 310 to include the member name or number for the user and the identification of the digitally-rendered book that is to be assigned to the user. Note that an entry for the user may already exist in user-assignment table 310 because the user was previously assigned some item of content; in this case, the existing entry (which will already include the first identifier for the user) can simply be updated to include the identification of the digitally-rendered book that is to be assigned to the user.

Next, content provider device 200 receives, from the user's device 206, a user identity message 314 comprising the first identifier for the user and a second identifier for the user (step 1504). Continuing with the example above, this operation comprises receiving a user identity message 314 with the above-described the member name or number for the user, as well as a user account identifier that identifies the user's account with the content provider (e.g., a login name or nickname), which is the second identifier for the user.

Content provider device 200 then, based on the first identifier for the user in the user identity message, updates the user-assignment table entry for the user to include the second identifier for the user from the user identity message (1506). Continuing with the example above, this operation comprises using information from user identity message 314 to update an entry in user-assignment table 310 for the user to include the user's login name. By doing this, content provider device 200 creates a mapping between the member name provided by the administrative user and an account that will eventually be used to electronically transfer the digitally-rendered book to the user's device. Note that, in some embodiments, the administrative user does not know the second identifier for the user, and hence the user provides this information. Additionally note that the receipt of the user identity message 314 may have occurred before the receipt of assignment message 308, and the values from the earlier user identity message 314 can have been used to update or establish the entry for the user in user-assignment table 310.

Next, content provider device 200 uses the second identifier and the listing of the item of content that is assigned to the user from the entry for the user in user-assignment table 310 to electronically transfer, from the server to the user's device, the item of content assigned to the user (step 1508).

Continuing with the example above, this operation comprises the content provider device 200 using the entry for the church member from the user-assignment table 310 to determine the user's login name (or other personal account information), and then using the user's login name (or other personal account information) to determine how to electronically transfer the digitally-rendered book to the user.

Figure 16:
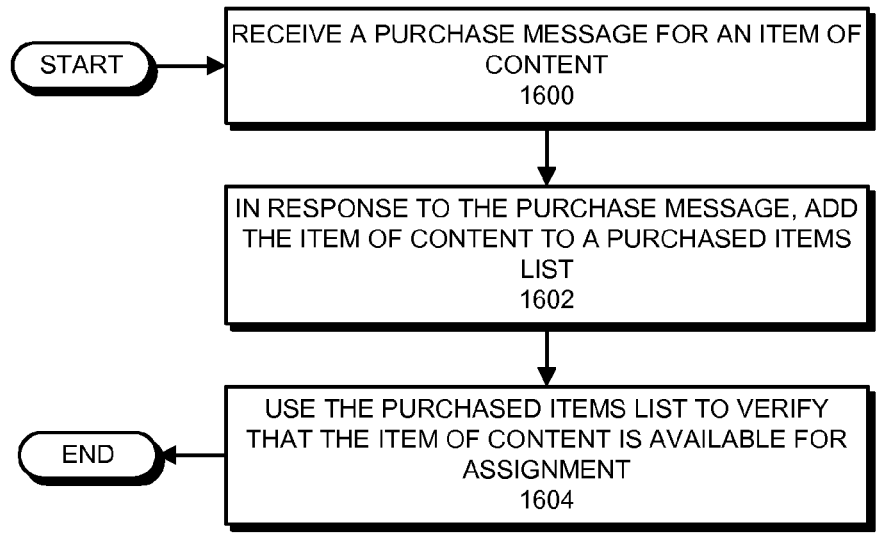
FIG. 16 presents a flowchart illustrating a process for purchasing items of content for assignment in accordance with the described embodiments.

FIG. 16 presents a flowchart illustrating a process for purchasing items of content for assignment in accordance with the described embodiments. The operations shown in FIG. 16 can occur before (the purchase) and during (the verification) the operations shown in FIG. 15. In addition, although certain operations in FIG. 16 are presented in a given order as an illustration of some embodiments, alternative embodiments include a different number of operations and/or perform the operations in a different order. Generally, any number of operations can be performed that enable the assignment of an item of content to a user such as herein described.

The operations shown in FIG. 16 start when content provider device 200 receives, from a purchasing device, a purchase message 300 for the item of content (step 1600). Continuing the example above, content provider device 200 can receive, from a purchasing device/computer operated by a secretary at the church, a purchase message indicating that the digitally-rendered book is to be purchased. Note that the purchasing device can be a device separate from the administrative device, but may not be (the same is true for the administrative user and the purchasing user that operates the purchasing device—these may be different users, but are not in some embodiments). For example, the church may have a purchasing user that operates a first computer system to make purchases and an administrative user that operates a second computer system to perform assignments of items of content and other tasks. In response to purchase message 300, content provider device 200 adds the item of content to a purchased list 302 (step 1602). Next, when performing the assignment operation in FIG. 15, content provider device 200 uses the purchased items list to verify that the item of content is available for assignment (step 1604).

Figure 17:
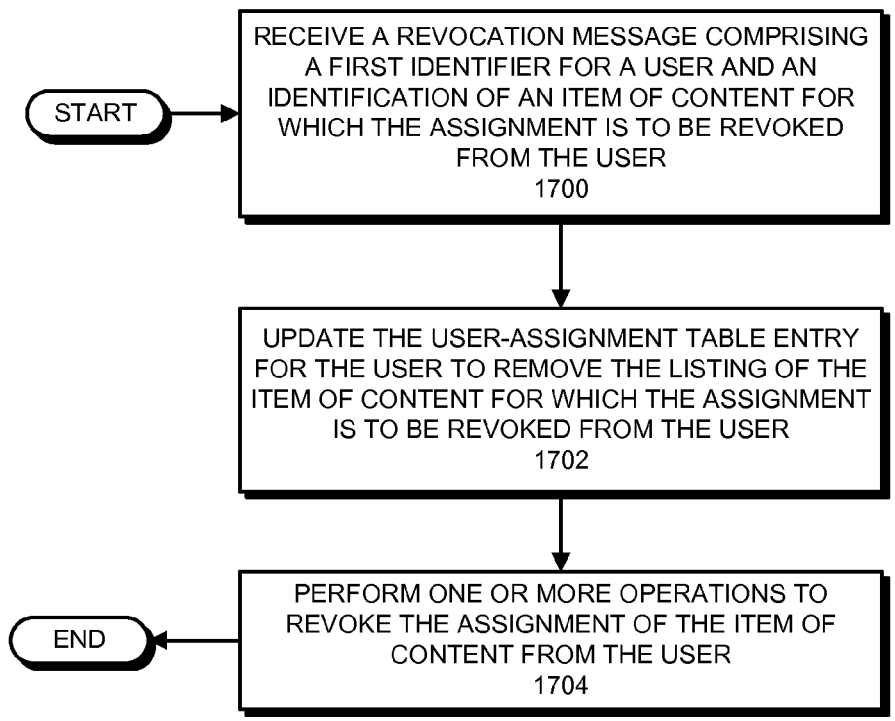
FIG. 17 presents a flowchart illustrating a process for revoking an assignment of an item of content from a user in accordance with the described embodiments.

FIG. 17 presents a flowchart illustrating a process for revoking an assignment of an item of content in accordance with the described embodiments. In the example shown in FIG. 17, an administrative user revokes the assignment of a single item of content from a user. However, as described above, the described embodiments function similarly in cases where the administrative user revokes the assignment of two or more items of content from two or more users. In addition, although certain operations in FIG. 17 are presented in a given order as an illustration of some embodiments, alternative embodiments include a different number of operations and/or perform the operations in a different order. Generally, any number of operations can be performed that enable the revocation of the assignment of an item of content to a user such as herein described.

The operations shown in FIG. 17 start when content provider device 200 receives, from administrative device 204, a revocation message 1100 comprising a first identifier for a user and an identification of an item of content for which the assignment is to be revoked from the user (step 1700). Continuing the example above, content provider device 200 can receive from administrative device 204 operated by the pastor of the church an revocation message 1100 indicating that the assignment of the digitally-rendered book to the above-described member of the church is to be revoked.

Content provider device 200 then updates the user-assignment table 310 entry for the user to remove the listing of the item of content for which the assignment has been revoked from the user (step 1702). Next, content provider device 200 performs one or more operations to revoke the assignment of the item of content from the user (step 1704). As described above, these operations can include any operation permitted by the particular implementation for revoking assignments of items of content, thereby leading to at least some loss of rights for the user with regard to the item of content. The loss of rights for the user with regard to an item of content can be manifested in various ways, depending on the nature of the item of content and amount of control that the administrative user is given over items of content on a user's device.

Receipts for Controlling User's Rights to Items of Content

As described above, in some embodiments, user device 206 may include mechanisms for partially or completely disabling and/or blocking access to an item of content on user device 206. For example, user device 206 may include one or more tokens, code libraries, certificates, timer values, etc. that are incorporated in and/or associated with an item of content that has been assigned to the user. In some embodiments, the mechanisms for partially or completely disabling and/or blocking access to an item of content on user's device 206 include an electronic receipt. Generally, a receipt includes one or more files associated with, but separate from, an item of content that include one or more indicators that are used by user device 206 to determine when the receipt has expired. When the receipt is expired, the item of content is expired—and therefore is to be partially or completely disabled and/or access to the item of content is to be blocked. For example, in some embodiments, an application (e.g., an office task application, a scientific computing application, a media processing application, etc.) is associated with a receipt that includes one or more of an expiration date or a revocation reason. Based on the expiration date and/or the revocation reason, user device 206 can determine whether the receipt (and hence the application) has expired. When the application has expired, user device 206 executes the application on user device 206 with predetermined functions of the application disabled or an operating system on user device 206 prevents access to the application (e.g., prevents the application from launching). As another example, a digitally-encoded media file (e.g., an electronic textbook, a video file, etc.) may be associated with a receipt and user device 206 can similarly completely/partially disable and/or block access to some or all of the digitally-encoded media file based on an expiration date and/or a revocation reason in the receipt.

In some embodiments, the receipt comprises a number of entries, each of which includes information for: (1) determining if the associated item of content has expired and/or the assignment of the associated item of content has been revoked; (2) verifying that the receipt is associated with the item of content and/or user device 206; (3) determining that the item of content has been assigned to the user of user device 206; (4) authenticating that the receipt was provided by content provider device 200; and/or (5) for performing other operations. During operation, user device 206 (e.g., one or more operating systems, daemons, and/or applications executing on user device 206 and/or hardware functional blocks in user device 206) reads the receipt to determine some or all of the information in the receipt for the associated item of content.

Figure 18:
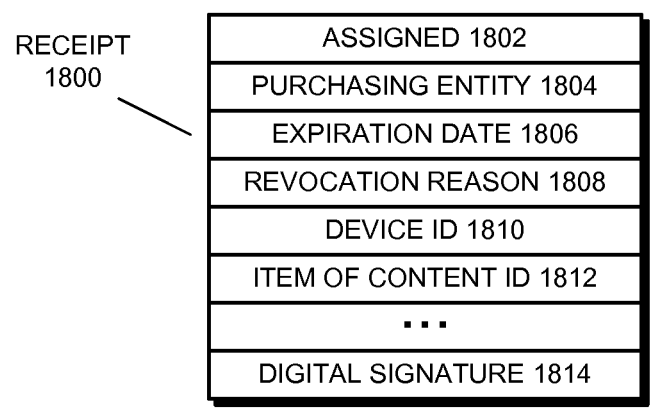
FIG. 18 presents a block diagram illustrating a receipt in accordance with the described embodiments.

FIG. 18 presents a block diagram illustrating a receipt 1800 in accordance with the described embodiments. As shown in FIG. 18, the entries in receipt 1800 include: assigned 1802, purchasing entity 1804, expiration date 1806, revocation reason 1808, device identifier (ID) 1810, item of content identifier (ID) 1812, and digital signature 1814. In some embodiments, the assigned 1802 entry includes information that may be used to determine if the associated item of content was assigned to a user of user device 206 by a purchasing entity (using the assignment operation herein described). For example, the assigned 1802 entry in receipt can include a non-zero value to indicate that the associated item of content was assigned to the user and a zero to indicate that the associated item of content was not assigned to the user. Note that, when the assigned 1802 entry indicates that the associated item of content was not assigned to the user, one or more of the other entries (revocation reason 1808, purchasing entity 1084, etc.) in the receipt may be blank or contain a predetermined value (e.g., 0, 999, and/or another value) because the associated item of content was not assigned to the user.

In some embodiments, the purchasing entity 1804 entry includes information that may be used to determine an identity of the purchasing entity (if any) that assigned the item of content to the user of user device 206. For example, in some embodiments, the purchasing entity 1804 entry includes a text string (e.g., "Acme Co.") that identifies the purchasing entity.

In some embodiments, the expiration date 1806 entry includes information that may be used to determine an expiration date for the receipt 1800. For example, in some embodiments, the expiration date 1806 entry includes one or more values indicating a time (e.g., a given hour, day, etc.) after which the receipt is to be considered by user device 206 as expired. In these embodiments, after the expiration date has passed, the associated item of content is considered expired and the item of content is partially or completely disabled and/or access to the item of content is blocked.

In some embodiments, the revocation reason 1808 entry includes information that may be used to determine if the assignment of the associated item of content has been revoked (or not) by a purchasing entity. In these embodiments, the revocation reason 1808 entry may include a value (e.g., a numerical value, a character string, a pattern of bits, and/or another value) that, when read by user device 206, can be interpreted to indicate that the assignment of the associated item of content has or has not been revoked by a purchasing entity and possibly why the assignment of the item of content was revoked. For example, in some embodiments, the revocation reason 1808 entry includes a numerical value from a predetermined set of numerical values, each of which represents a different reason why an assignment may be revoked (e.g., employment/membership terminated, item of content no longer needed/current, and/or another reason). As another example, in some embodiments, the revocation reason 1808 entry includes a text string describing the reason for the revocation of the assignment. In some embodiments, any time that the revocation reason 1808 entry contains a value other than a predetermined value (e.g., 0, 999, and/or another value), user device 206 interprets the revocation reason 1808 entry to indicate that the assignment of the associated item of content has been revoked.

In some embodiments, the device ID 1810 and the item of content ID 1812 entries in receipt 1800 include information that may be used to determine if the receipt was intended for user device 206 and for the associated item of content, respectively. In these embodiments, the device ID 1810 entry may include any identifier or combination of identifiers that represents user device 206 (e.g., some or all of a MAC address for user device 206, a machine identifier for user device 206, a system profile representation for user device 206, and/or another identifier). In addition, in these embodiments, item of content ID 1812 may include any identifier or combination of identifiers that represents the associated item of content (e.g., some or all of a unique identifier for the item of content, a vendor identifier, and/or another identifier). Note that the identifier that represents user device 206 in the device ID 1810 entry may not uniquely identify user device 206, but instead may generally indicate that receipt 1800 is likely intended for user device 206 (e.g., may include only a portion of a unique identifier for user device 206, etc.). The same is true for the identifier that represents the item of content in item of content ID 1812.

In some embodiments, the digital signature 1814 entry in receipt 1800 includes a digital signature that may be used to determine if the receipt was generated by content provider device 200. In these embodiments, the digital signature is a cryptographic signature that can be compared with a previously received digital certificate received from content provider device 200 to authenticate that the receipt was received from the content provider device 200.

In some embodiments, using information from one or both of the expiration date 1806 and revocation reason 1808 entries, user device 206 can determine if an item of content is to be partially or completely disabled and/or if access to the item of content is to be blocked. For example, when the item of content is an application, if the application should be executed with predetermined functions of the application enabled or disabled. As another example, when the item of content is an application, if an operating system on user device 206 should prevent access to the application (i.e., prevent the application from launching). More specifically, in these embodiments, based on information from the expiration date 1806 and revocation reason 1808 entries, user device 206 can determine that: (1) the receipt expires after an expiration date; (2) the assignment of the item of content is to be revoked after an expiration date; and/or (3) the assignment of the item of content is to be revoked immediately. When the receipt is expired and/or the assignment is revoked, the item of content is partially or completely disabled and/or access to the item of content is blocked.

In these embodiments, user device 206 may determine that the receipt expires after an expiration date when the expiration date 1806 entry includes information representing an expiration date for the receipt 1800 and the revocation reason 1808 entry is blank or contains a predetermined value that indicates that the assignment of the associated item of content has not been revoked by a purchasing entity. In addition, user device 206 may determine that the assignment of the item of content is revoked after an expiration date when the expiration date 1806 entry includes information representing an expiration date for the receipt 1800 and the revocation reason 1808 entry contains value that indicates that the assignment of the associated item of content has been revoked by a purchasing entity (e.g., a numerical code, text string, etc.). User device 206 may also determine that the assignment of the item of content is to be revoked immediately when the expiration date 1806 entry is blank or includes a predetermined value that indicates no expiration date/an unspecified expiration date and the revocation reason 1808 entry contains value that indicates that the assignment of the associated item of content has been revoked by a purchasing entity. As described in more detail below, using the information from one or both of the expiration date 1806 and revocation reason 1808 entries in this way can enable the described embodiments to assist with enforcing the revocation of the assignment of the item of content (cases (2) and (3) above) and assist with preventing the evasion of the enforcement of the revocation of the assignment of the item of content (case (1) above).

In some embodiments, during an authentication process for receipt 1800, user device 206 (e.g., one or more operating systems, daemons, and/or applications executing on user device 206 and/or hardware functional blocks in user device 206) can read information from the device ID 1810, the item of content ID 1812, and/or the digital signature 1814 entries in receipt 1800 and can use the information to determine that receipt 1800 is authentic and/or that the receipt is intended for user device 206 and the associated item of content. Based on this determination, subsequent operations (e.g., the determination if the receipt is expired, if the assignment of the item of content has been revoked, etc.) may be allowed to proceed.

As described above, in some embodiments, one or more of the entries in receipt 1800 may be blank or contain a predetermined value that is interpreted accordingly by user device 206. For example, in some embodiments, when the assignment of the associated item of content to a user of user device 206 has not been revoked (and hence the item of content is still assigned to the user), revocation reason 1808 in receipt 1800 may be blank or contain a predetermined value (e.g., 0, 999, and/or another value). In this case, upon reading receipt 1800, user device 206 interprets receipt 1800 to indicate that the assignment of the associated item of content has not been revoked. As another example, in some embodiments, expiration date 1806 may be blank or contain a predetermined value (e.g., 0, 999, and/or another value) and revocation reason 1808 may contain a value indicating a revocation reason. In this case, upon reading receipt 1800, user device 206 interprets receipt 1800 to indicate that the assignment of the item of content has been revoked and that the revocation is effective immediately (due to the lack of the expiration date).

In some embodiments, receipt 1800 is implemented in a file with a number of key-value pairs. For example, a key might be "assigned" and the corresponding value may be "1" (when the item of content is assigned) or "0" (when the item of content is not assigned). In some embodiments, receipt 1800 is implemented as an XML file. In these embodiments, the XML file includes a section with values that represent the above-described entries from the receipt. In some embodiments, the receipt is in the Abstract Syntax Notation One (ASN.1) format and is wrapped in the Cryptographic Message Syntax Standard (PKCS7) format.

Although receipt 1800 is shown with various entries, in some embodiments, receipt 1800 includes a different number and/or arrangement of entries. For example, in some embodiments, one or more of the described entries are not included in receipt 1800 or additional entries are included in receipt 1800 (as shown by the ellipsis in FIG. 18). Generally, receipt 1800 includes any number or arrangement of entries useful for performing the operations herein described.

Using Receipts for Controlling User's Rights to Items of Content

In the described embodiments, user device 206 uses receipts such as receipt 1800 to control user's rights to items of content. More specifically, before using an item of content, user device 206 reads information from a receipt associated with the item of content to determine if the information indicates either that the receipt is expired or that the assignment of the item of content to a user of user device 206 has been revoked. If the receipt is expired or the assignment has been revoked, user device 206 partially or completely disables the item of content and/or blocks access to the item of content. For example, when the item of content is an application and an associated receipt indicates either that the receipt is expired (and hence the application is expired) or that the assignment of the application has been revoked, user device 206 executes the application with predetermined functions of the application disabled or an operating system on user device 206 prevents access to the application (e.g., prevents the application from launching). Otherwise, when the associated receipt does not indicate that the receipt is expired or that the assignment has been revoked, user device 206 executes the application with predetermined functions of the application enabled or an operating system on user device 206 allows access to the application.

Figure 19:
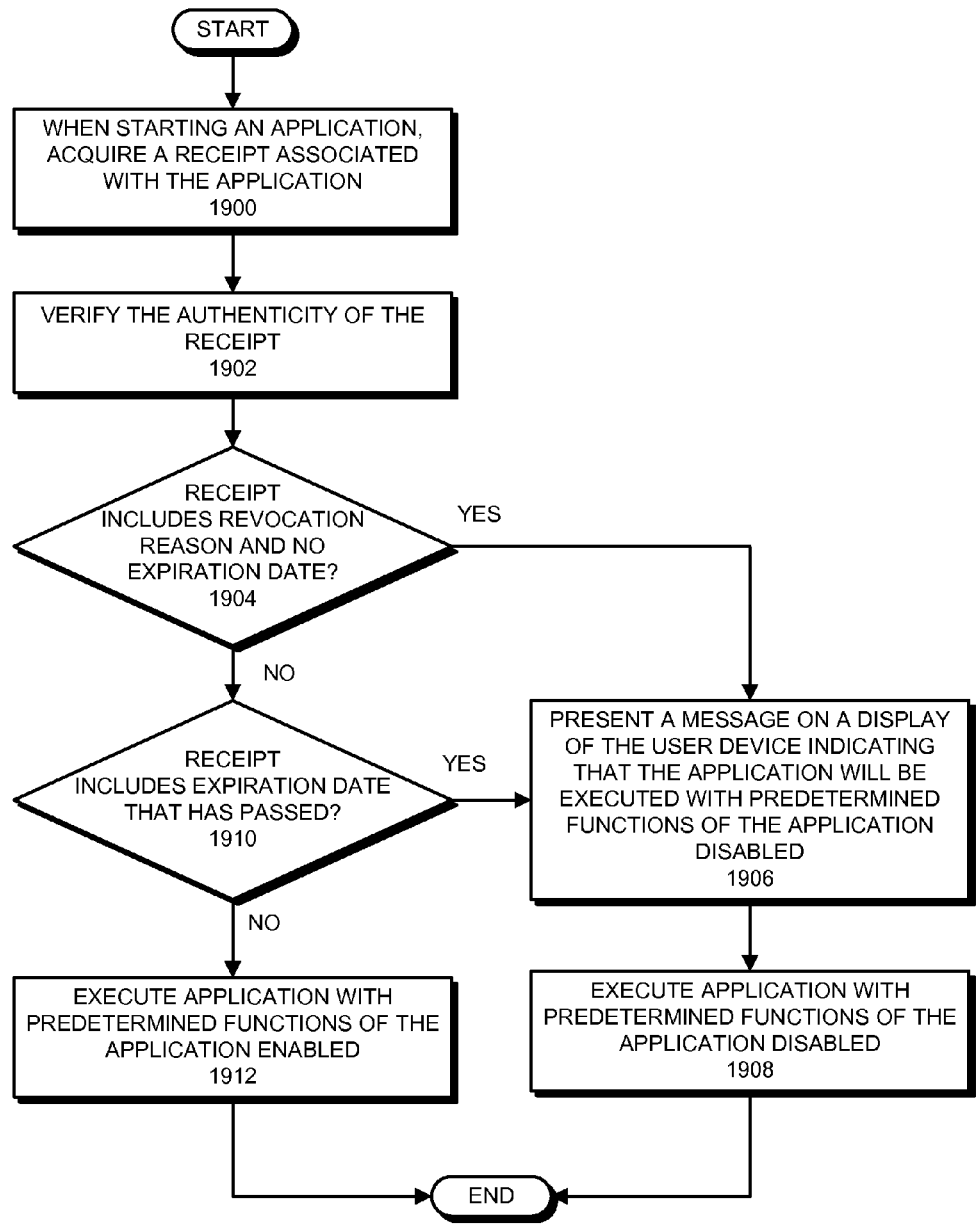
FIG. 19 presents a flowchart illustrating a process for using a receipt to control a user's rights to an associated item of content in accordance with the described embodiments.

FIG. 19 presents a flowchart illustrating a process for using a receipt 1800 to control a user's rights to an associated item of content in accordance with the described embodiments. Note that the operations shown in FIG. 19 are presented as a general example of functions performed by some embodiments. The operations performed by other embodiments include different operations and/or operations that are performed in a different order. Additionally, although certain mechanisms are used in describing the processes, in some embodiments, other mechanisms can perform the operations.

For the operation in FIG. 19, an application (e.g., an office task application such as a spreadsheet, word processor, etc., a media processing application, a game application, or another application) is used as an exemplary item of content. Thus, the operations in FIG. 19 are performed for an application. For example, in one of the operations, the application is executed with predetermined functions of the application disabled (step 1908). However, the described embodiments are not limited to an application as the item of content; similar operations can be performed for any of the above-described items of content. However, minor differences may occur. For example, when the item of content is a digitally-encoded media file, instead of "disabling" or "enabling" "functions" such as with an application, some or all of the digitally-encoded media file may be rendered inaccessible or accessible, etc. Generally, in these embodiments, when an associated receipt indicates that an expiration date has passed and/or an assignment has been revoked, some or all of a user's rights to an item of content are limited.

In addition, as described above, when a receipt for an item of content is expired or the assignment of the item of content has been revoked, an operating system on user device 206 may block access to the item of content. For example, for an application, the operating system my prevent the application from launching and/or otherwise block access to the application. However, in the following description, for clarity and brevity, an example is used where user device 206 executes an application with predetermined functions disabled.

The process shown in FIG. 19 starts when a user device 206 (e.g., processing subsystem 102 on user device 206) starts an application. When starting the application, user device 206 acquires receipt 1800 associated with the application (step 1900). For example, user device 206 can retrieve a file (e.g., a text file, an XML file, an encrypted file, etc.) for receipt 1800 from a directory where the file is stored in memory subsystem 104.

User device 206 then verifies the authenticity of receipt 1800 (step 1902). For example, user device 206 can use information from one or more of the device ID 1810, item of content ID 1812, and the digital signature 1814 entries in receipt 1800 to perform one or more authentication operations for receipt 1800. The authentication operations can include cryptographically verifying the digital signature 1814 entry against an existing digital certificate, confirming that the device ID from the device ID 1810 entry matches an identifier for user device 206, confirming that the item of content ID from the item of content ID 1812 entry matches an identifier for the application, and/or other operations. For this example, it is assumed that receipt 1800 is verified to be authentic. If receipt 1800 was not verified to be authentic, the operations in FIG. 19 may be terminated and a remedial/corrective action may be performed (e.g., the application may be executed with predetermined functions disabled, a warning message may be displayed on a display for user device 206, etc.).

After verifying the authenticity of receipt 1800, user device 206 determines if receipt 1800 includes a revocation reason, but does not include an expiration date (step 1904). When this occurs, user device 206 determines that receipt 1800 indicates that the assignment of the application to a user of user device 206 has been revoked effective immediately (and hence the application has expired). User device 206 therefore presents a message on a display of user device 206 indicating that the application will be executed with predetermined functions of the application disabled (step 1906). More specifically, in this message, user device 206 informs a user of the device that the assignment of the application has been revoked and therefore the application will be executed with predetermined functions of the application disabled (including possibly identifying the predetermined functions that have been disabled). In some embodiments, the message includes a link, button, or other reference that enables the user to proceed to the interface to the e-commerce store/site hosted by content provider device 200, where a copy of the application can be purchased (thereby re-enabling the application on user device 206).

Figure 20:
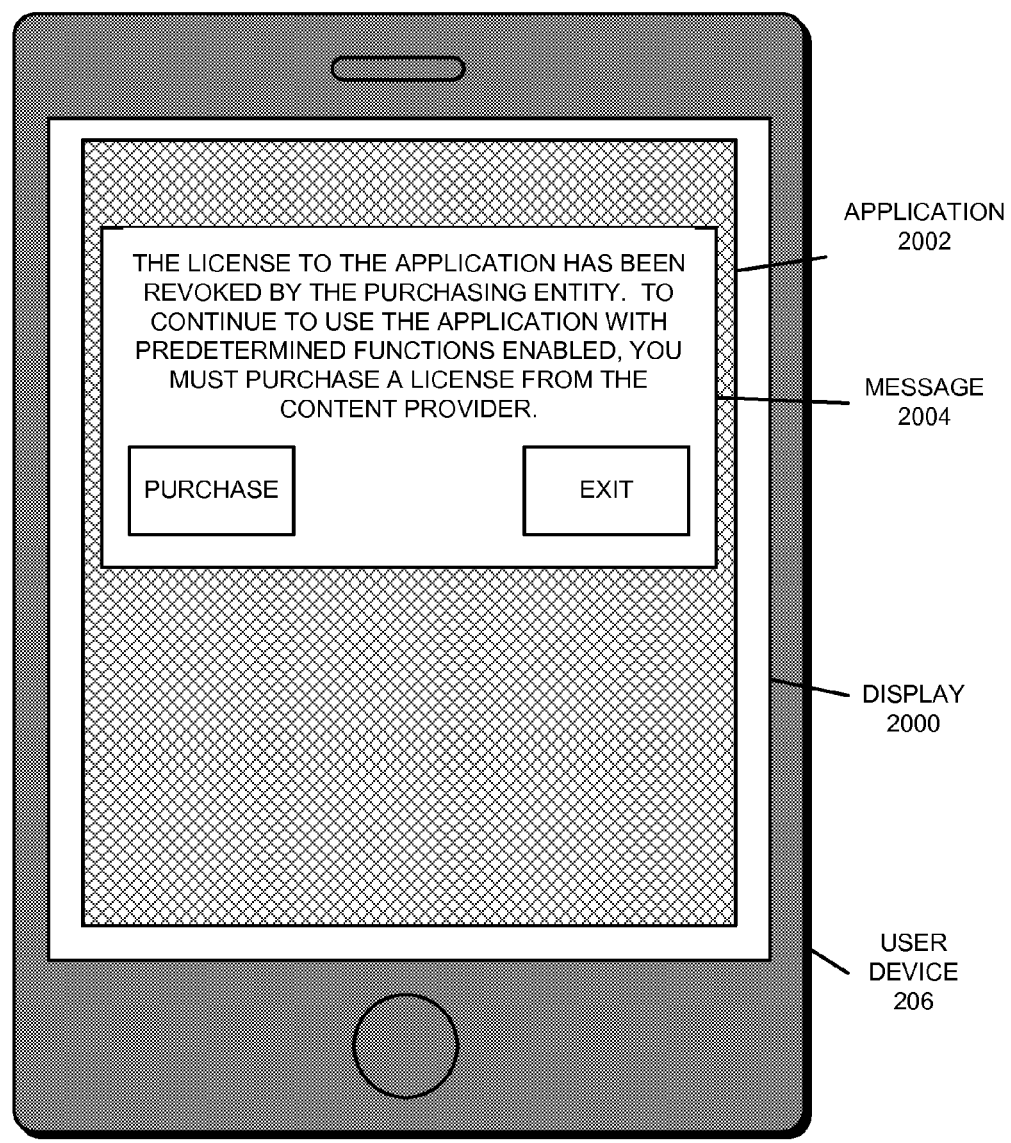
FIG. 20 presents a block diagram illustrating a message presented for an application for which the assignment has been revoked in accordance with the described embodiments.

FIG. 20 presents a block diagram illustrating a message 2004 presented for an application 2002 for which the assignment has been revoked in accordance with the described embodiments. As can be seen in FIG. 20, message 2004, which is presented in display 2000 of user device 206, includes text indicating that the license has been revoked (including identifying the predetermined functions that have been disabled), along with "purchase" and "exit" buttons. In these embodiments, selecting the purchase button (e.g., touching a touch screen in an area of the purchase button, hovering a mouse pointer over the purchase button and clicking a mouse button, etc.) causes user device 206 to proceed to the interface to the e-commerce store/site hosted by content provider device 200, and selecting the exit button causes the message to disappear so that the application 2002 can be used with the predetermined functions disabled.

In some embodiments, message 2004 may also include an indication that the purchasing entity identified in the purchasing entity 1804 entry (e.g., "Acme Co.") has revoked the assignment and/or may be arranged to include at least some of the information from the revocation reason from the revocation reason 1808 entry. For example, the first sentence of the message may read "the license to the application has been revoked by purchasing entity because you have left employment with the purchasing entity" where "leaving employment" (or a representation thereof, such as a numeric code) is the revocation reason.

After presenting the message, user device 206 executes the application with predetermined functions of the application disabled (step 1908). Depending on the implementation and the type of application, various functions of the application may be disabled when executing the application. For example, in some embodiments, one or more of an updating function or an install function of the application may be disabled to prevent the application from being reinstalled and/or updated on user device 206. As another example, one or more operational functions of the application may be disabled, which prevents corresponding functions of the application from being performed. For example, a file saving or editing function can be disabled so that files generated in the application can not be saved or files cannot be edited, a counter can be enabled so that the application runs normally, but can only be opened a predetermined number of times (e.g., 2, 5, etc.). As another example, the application can be prevented from communicating with some or all other applications on user device 206 and/or a network communication function of the application can be disabled, preventing the application from communicating using a network connection. More generally, any function or portion thereof for the application can be disabled. In this way, some or all of a user's rights to the application are limited (by disabling the predetermined functions of the application) when the assignment of the application to the user has been revoked.

Note that, when presented with the message in step 1906, the user may purchase a copy of the application (i.e., a license for the application), after which the application may function normally. More specifically, some or all of the predetermined functions may be enabled, depending on the type of license purchased and other factors. For this example, however, it is assumed that the user does not purchase the copy of the application and thus the application is executed with the predetermined functions disabled.

If receipt 1800 does not include a revocation reason, but not an expiration date (step 1904), user device 206 determines if receipt 1800 includes an expiration date that has passed (step 1910). If so, the receipt is expired and hence the application has expired. User device 206 therefore presents a message on a display of user device 206 indicating that the application will be executed with predetermined functions of the application disabled (step 1906).

When the receipt is determined to be expired (step 1910), if there is no revocation reason included in receipt 1800, user device 206 determines that the receipt 1800 is simply expired (and, thus, the application may still be assigned to the user) and, in the presented message, user device 206 informs a user of the device that user device 206 should contact content provider device 200 to obtain an updated receipt with an extended expiration date to enable executing the application on user device 206 with the predetermined functions of the application enabled after the expiration date. In some embodiments, the message includes a link, button, or other reference that enables the user to cause user device 206 to contact content provider device 200 to obtain an updated receipt with an extended expiration date (thereby re-enabling the application on user device 206). Note that the updated receipt obtained from content provider device 200 may include an indication that the assignment of the application is immediately revoked, which is handled accordingly (e.g., similarly to steps 1904-1908), or is revoked after an expiration date, which is handled accordingly (e.g., similarly to steps 1910-1908).

Figure 21:
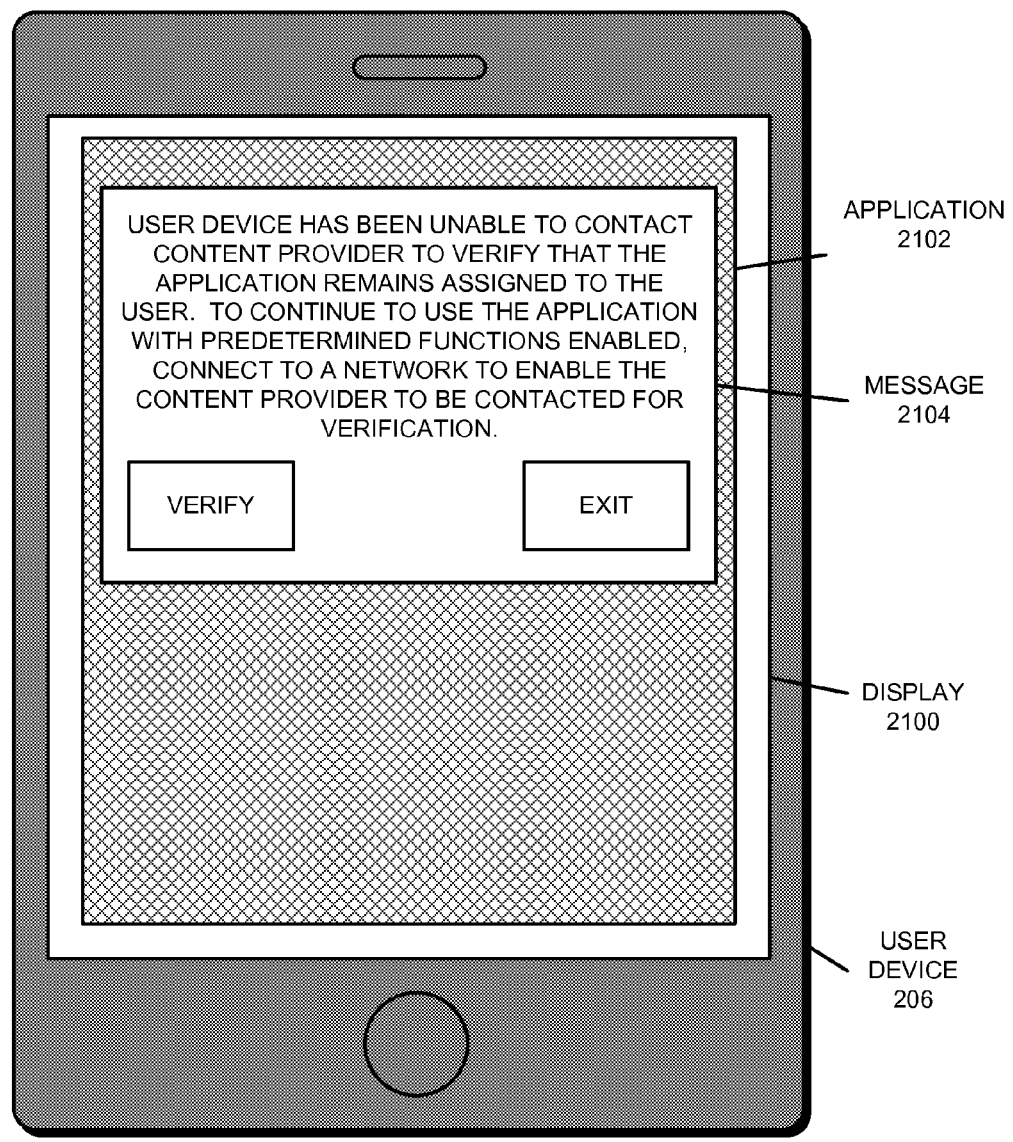
FIG. 21 presents a block diagram illustrating a message presented for an application for which the receipt has expired in accordance with the described embodiments.

FIG. 21 presents a block diagram illustrating a message 2104 presented for an application 2102 for which the receipt has expired in accordance with the described embodiments. As can be seen in FIG. 21, message 2104, which is presented in display 2100 of user device 206, includes text indicating that user device 206 has been unable to contact content provider device 200 to obtain an updated receipt (which is described as "verify that the application remains assigned to the user" in the text of the message, in order to avoid confusing the user with descriptions of an expired receipt), including identifying the predetermined functions that have been disabled, along with "verify" and "exit" buttons. In these embodiments, selecting the verify button causes user device 206 to (manually) begin a process for contacting content provider device 200 to obtain an updated receipt, and selecting the exit button causes the message to disappear so that the application 2102 can be used with the predetermined functions disabled.

Otherwise, when the receipt is determined to be expired (step 1910), if there is a revocation reason included in the receipt, user device 206 determines that the application has been revoked and, in the presented message, user device 206 informs a user of the device that the assignment of the application has been revoked. In some embodiments, the message includes a link, button, or other reference that enables the user to proceed to the interface to the e-commerce store/site hosted by content provider device 200, where a copy of the application can be purchased (thereby re-enabling the application on user device 206). The message may also include a particular indication that the purchasing entity (e.g., "Acme Co.") has revoked the assignment. FIG. 20 presents an example of such a message.

After presenting the message upon determining that the receipt is expired (step 1910), user device 206 executes the application with predetermined functions of the application disabled (step 1908).

Otherwise, if receipt 1800 includes an expiration date that has not passed (step 1910), the receipt is not expired and hence the application has not expired. In this case, user device 206 executes the application with predetermined functions of the application enabled (step 1912). As described above, the predetermined functions of the application can, depending on the implementation, include various functions of the application. For example, in some embodiments, when executing the application with predetermined functions of the application enabled, user device 206 executes the application typically/normally.

In some embodiments, when the expiration date is present and is less than a threshold time away (e.g., less than 30 days away, 120 hours away, or another threshold time), if there is no revocation reason in receipt 1800, user device 206 can present a message similar to the message shown in FIG. 21, with the addition of a description of the expiration date. For example, the second sentence in FIG. 21 in this case could read "to continue to use the application with predetermined functions enabled after XXX, please connect to a network to enable contact with the content provider," where XXX (e.g., 6 May 2013) is the expiration date. This provides the user with additional time to cause user device 206 to contact content provider device 200 before the expiration date to obtain the updated receipt—thereby avoiding the application possibly being executed with the predetermined functions disabled. A similar operation can be performed for the case where there is an expiration date and a revocation reason (and hence the application is revoked as of the expiration date) using a similarly modified version of the message shown in FIG. 20.

Note that, in the case where both an expiration date and a revocation reason are not present in receipt 1800, an error has occurred (e.g., receipt 1800 could be malformed and/or corrupted) and user device 206 should retrieve another receipt 1800 from content provider device 200. This case and outcome is not shown in FIG. 19.

By executing the application as described, these embodiments assist with enforcing the revocation of the assignment of the item of content by preventing the application from executing with the predetermined functions enabled when the receipt includes a revocation reason (with an expiration date that has passed in step 1910 or without an expiration date in step 1904). These embodiments also assist with preventing the evasion of the enforcement of the revocation of the assignment of the item of content by preventing the user from executing the application with the predetermined functions enabled when the expiration date indicates that the receipt (and hence the application) has expired as in step 1910.

Checking Receipts

Figure 22A:
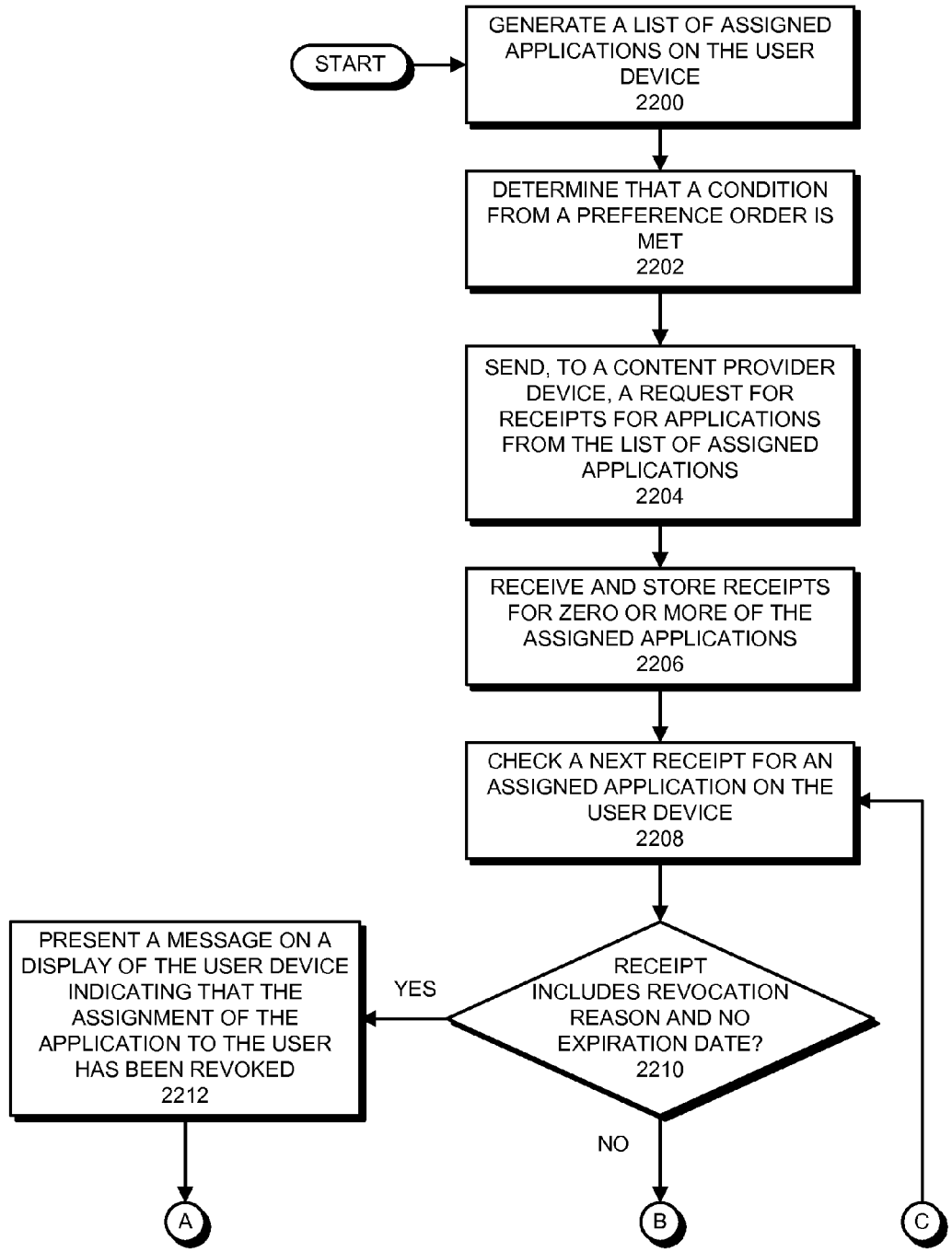
FIGS. 22A-22B (collectively, "FIG. 22") present a flowchart illustrating a process for checking receipts in a user device in accordance with the described embodiments.
Figure 22B:
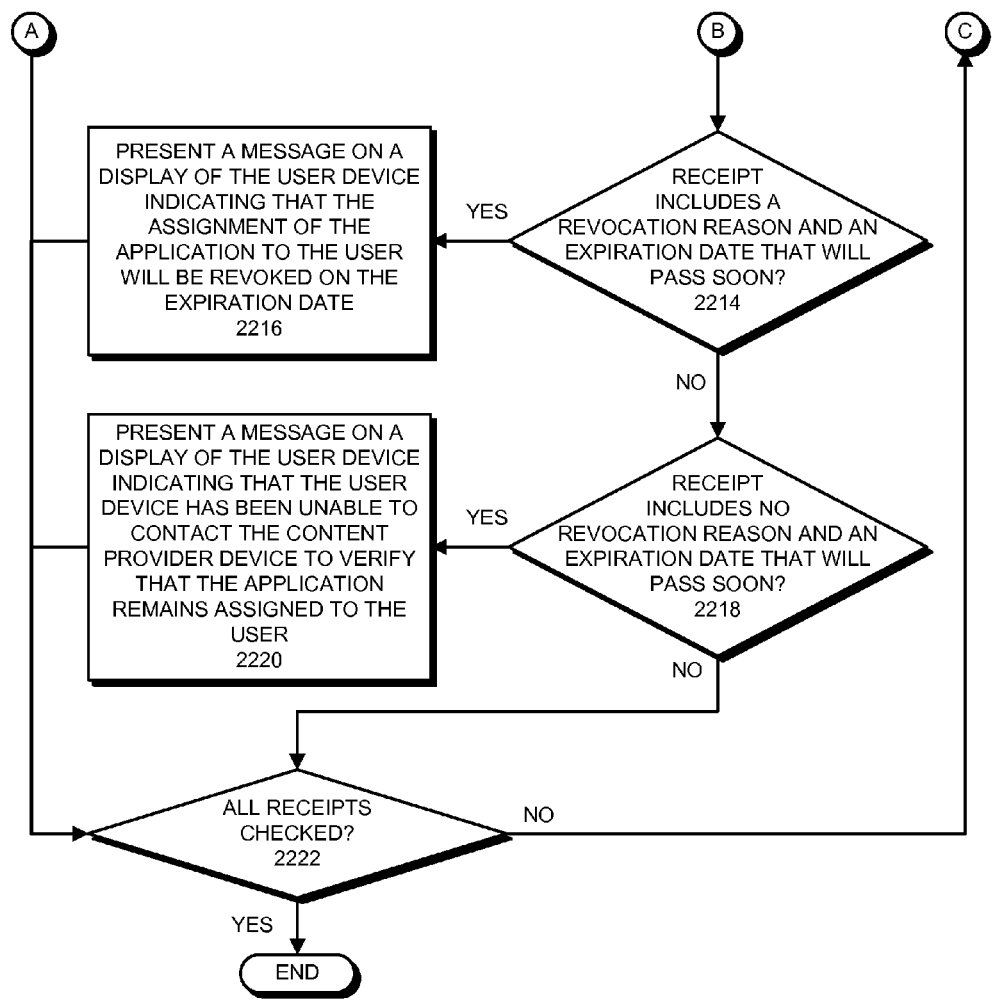

In some embodiments, user device 206 (e.g., one or more operating systems, daemons, and/or applications executing on user device 206 and/or hardware functional blocks in user device 206) periodically checks receipts for assigned applications on user device to determine if any receipts are set to expire less than a threshold time away. For example, every day, week, etc. user device can check the receipts to determine if any receipts are set to expire less than a threshold time away. FIGS. 22A-22B (collectively, "FIG. 22") present a flowchart illustrating a process for checking receipts 1800 in a user device 206 in accordance with the described embodiments. Note that the operations shown in FIG. 22 are presented as a general example of functions performed by some embodiments. The operations performed by other embodiments include different operations and/or operations that are performed in a different order. Additionally, although certain mechanisms are used in describing the processes, in some embodiments, other mechanisms can perform the operations.

For the operation in FIG. 22, applications are used as examples of items of content (e.g., an office task applications, a media processing applications, a game applications, and/or other applications or combinations of applications). Thus, the operations in FIG. 22 are performed for receipts associated with corresponding applications. However, the described embodiments are not limited to applications as the items of content; similar operations can be performed for any of the above-described items of content (or combinations thereof).

The process shown in FIG. 22 starts when a user device 206 (e.g., processing subsystem 102 on user device 206), during a periodic (e.g., daily, weekly, etc.) check of receipts for assigned applications on user device 206, generates a list of assigned applications on user device 206 (step 2200). In some embodiments, when performing this operation, user device 206 checks one or more existing receipts associated with corresponding applications on user device 206 to determine if the assigned 1802 entry indicates that the application was assigned to the user of user device 206 and, if so, adds the corresponding application to the list. Note that receipts are sent to user device 206 separately from, but along with, the application as the application is installed and then are updated as described in FIG. 22; these are the existing receipts that are checked in step 2200.

User device 206 then determines that a condition from a preference order is met (step 2202). In this operation, user device 206 ensures that a given combination of a preferred wireless network and power source is met. For example, during a first time interval (day, week, etc.), user device 206 performs the subsequent operations in FIG. 22 only if user device is receiving external power (e.g., is plugged in to a wall socket, etc.) and a wifi network (i.e., an 802.11 wireless network) is available for communicating with content provider device 200. In this way, user device 206, for a first time interval, does not unnecessarily consume battery power or use a network such as a cellular network where a user may have data usage limitations.

In some embodiments, the preference order is as follows. During a first predetermined time (e.g., day, week, etc.) following a last check of the receipts, if user device 206 is receiving power from an external power supply (e.g., a wall socket, an external battery, etc.) and a preferred network (e.g., a wifi network, etc.) is available, user device 206 sends the request for the updated receipt to content provider device 200 using the preferred network. For example, in some embodiments, if the check occurs daily, during a first week, updated receipts are requested only if user device 206 is connected to an external power source and the wifi network is available. After the first predetermined time, for a second predetermined time (e.g., day, week, etc.), if the preferred network is available, user device 206 sends the request for the updated receipt to content provider device 200 using the preferred network, regardless of a source from which user device 206 is receiving power. For example, in some embodiments, if the check occurs daily, during a second week (i.e., after the first week), updated receipts are requested only if the wifi network is available, but without regard as to whether user device 206 is receiving external power or is powered by an internal battery. After the second predetermined time, user device 206 sends the request for the updated receipt to the content provider device using any available network and regardless of the source from which user device 206 receives power. For example, in some embodiments, if the check occurs daily, during a third and subsequent weeks (i.e., after the second week), updated receipts are requested without regard as to whether user device 206 is receiving external power or is powered by an internal battery and without regard as to whether the cellular network is used to send the requests.

For the example in FIG. 22, it is assumed that the preference order is met (i.e., that a corresponding combination of power source and network connection are available). If the preference order is not met, the check may be delayed until a predetermined time (e.g., day, week, etc.) has passed and then retried (using the combinations of network and power source described above for the corresponding time interval). In some embodiments, when the preference order is not met, steps 2204 and 2206 may not be performed (i.e., updated receipts may not be obtained) and existing receipts may be used for performing the subsequent operations.

After determining that the preference order is met, user device 206 sends, to content provider device 200, a request for receipts associated with applications from the list of assigned applications (step 2204). As described above, this operation comprises using the appropriate network connection to send a message (e.g., packet, protocol data unit, etc.) to content provider device 200 that includes an identifier and/or authentication information for user device 206 and an application identifier for each application from the list of assigned applications. In response, user device 206 receives and stores updated receipts for zero or more of the assigned applications (step 2206). For this operation, user device 206 may receive updated receipts for "zero or more" of the assigned applications because, in an effort to reduce network traffic, content provider device 200 may not send receipts in which some or all of the information is the same as in an existing receipt. Thus, when some or all of the information in receipts in content provider device 200 is the same as in all of the existing receipts, zero updated receipts may be received from content provider device 200.

User device 206 then checks a next receipt for an assigned application on user device 206 (step 2208). For example, in some embodiments, using the list of assigned applications, user device 206 determines a next (next unchecked) assigned application, retrieves the receipt for the next assigned application from memory subsystem 104, and perform the checks described below using information from the retrieved receipt.

If the receipt includes a revocation reason, but does not include an expiration date (step 2210), the receipt indicates that the assignment of the application to the user is immediately revoked (as described above). For this reason, user device presents a message on a display of user device 206 indicating that the assignment of the application to the user has been revoked (step 2212). For example, this message may be similar to the message shown in FIG. 20. Note that, in some embodiments, this message is presented when the check is performed, and not necessarily when the application is being executed. Thus, this message may be presented without application 2002 as shown in FIG. 20 (i.e., can be presented at any time when user device 206 is operating). Presenting the message as described gives the user warning in time to cause user device 206 to contact content provider device 200 to purchase a copy of the application (i.e., a license for the application)—thereby avoiding the application possibly being executed with the predetermined functions disabled.

If the receipt includes a revocation reason and an expiration date that will pass soon (step 2214), the receipt indicates that the assignment of the application to the user will be revoked after the expiration date. "Soon," as it is used herein means "less than a threshold time in the future," where the threshold time is, e.g., a week, a month, etc. Because the application will be executed with the predetermined functions disabled when the assignment is revoked, user device presents a message on a display of user device 206 indicating that the assignment of the application to the user will be revoked on the expiration date (step 2216). For example, this message may be similar to the message shown in FIG. 20 (perhaps with the expiration date information included, as described above for FIG. 20). Note that, in some embodiments, this message is presented when the check is performed, and not necessarily when the application is being executed. Thus, this message may be presented without application 2002 as shown in FIG. 20 (e.g., can be presented at any time when user device 206 is operating). Presenting the message as described gives the user warning in time to cause user device 206 to contact content provider device 200 to purchase a copy of the application (i.e., a license for the application) before the expiration (revocation) date—thereby avoiding the application possibly being executed with the predetermined functions disabled after the expiration date.

If the receipt includes no revocation reason, but includes an expiration date that will pass soon (step 2218), the receipt indicates that the receipt (and thus the application) will expire after the expiration date. "Soon," as it is used herein means "less than a threshold time in the future," where the threshold time is, e.g., a week, a month, etc. Because the application be executed with the predetermined functions disabled after expiring, user device 206 presents a message on a display of user device 206 indicating that user device 206 has been unable to contact content provider device 200 to verify that the application remains assigned to the user (step 2220). For example, this message may be similar to the message shown in FIG. 21 (perhaps with the expiration date included, as described above for FIG. 21). Note that, in some embodiments, this message is presented when the check is performed, and not necessarily when the application is being executed. Thus, this message may be presented without application 2102 as shown in FIG. 21 (e.g., can be presented at any time when user device 206 is operating). Presenting the message as described gives the user warning in time to cause user device 206 to contact content provider device 200 to obtain an updated receipt for the application (with an extended expiration date) before the expiration date—thereby avoiding the application possibly being executed with the predetermined functions disabled after the expiration date.

User device 206 then determines if the receipts for all assigned applications have been checked (step 2222). If not, user device 206 returns to step 2208 to check a next receipt for an assigned application on user device 206. Otherwise, the process ends.

In some embodiments, some or all of the above-described messages are presented only a given number of times (e.g., every other day, only 5 times, etc.) to avoid unnecessarily disturbing the user. Alternatively, the message may include an additional "do not show again" button (not shown) that causes the message not to be shown during a next check.

Multiple Receipts

In some embodiments, multiple entities may concurrently assign the same item of content to a user. For example, an employer and a school may concurrently assign an application to a user. In these embodiments, receipts may be available from each of the assigning entities. When this occurs, in some embodiments, a receipt with a latest expiration date is provided by content provider device 200 to user device 206 in response to a request for receipts for applications (such as in step 2204 in FIG. 22). In addition, if one entity revokes the assignment of the item of content, but the assignment of the item of content by the other entity is still valid, in these embodiments, the item of content remains assigned to the user. Generally, given two or more receipts, these embodiments use the most permissive available receipt. Thus, expiration and/or revocation occurs in these embodiments when the last receipt expires and/or when the last entity revokes the assignment of the item of content.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method comprising:
acquiring, by a user device, a receipt associated with an application on a user device, wherein the application was purchased by a purchasing entity from a content provider and installed on the user device after being assigned to a user of the user device by the purchasing entity, the assigning comprising a purchasing entity device indicating, to a content provider device, that the purchasing entity is providing the user the right to use the application with predetermined functions of the application enabled, where the user device, content provider device, and purchasing entity device are distinct devices from each other and where the user, content provider and purchasing entity are distinct entities from each other;

determining, by the user device, using the receipt, that the application has expired, the determining comprising acquiring, from the receipt, both a value for a revocation reason and a value for an expiration date and determining, based on the value for the revocation reason and the value for the expiration date that the application has expired, where the value for the revocation reason indicates that the purchasing entity has revoked the assignment of the application to the user; and when the application has expired, executing, by the user device, the application on the user device with the predetermined functions of the application disabled.

2. The method of claim 1, wherein determining, using the receipt, that the application has expired comprises:

when the value for the expiration date has passed, determining that the application has expired.

3. The method of claim 2, wherein, when the value for the expiration date has passed or is less than a threshold time away and the value for the revocation reason indicates that the assignment of the application to the user has been revoked by the purchasing entity, presenting a message on a display of the user device indicating that the assignment of the application to the user has been revoked and that application should be purchased to enable executing the application on the user device with the predetermined functions of the application enabled after the expiration date.

4. The method of claim 3, wherein presenting the message on the display of the user device indicating that the assignment of the application to the user has been revoked comprises configuring the message based on the value for the revocation reason.

5. The method of claim 1, wherein determining, using the receipt, that the application has expired comprises:

when the value for expiration date is empty or set to an unspecified value and the value for the revocation reason indicates that the assignment of the application to the user has been revoked, determining that the application has expired.

6. The method of claim 5, wherein, when the value for expiration date is empty or set to an unspecified value and the value for the revocation reason indicates that the assignment of the application to the user has been revoked:

presenting a message on a display of the user device indicating that the assignment of the application to the user has been revoked and that application should be purchased to enable executing the application on the user device with the predetermined functions of the application enabled.

7. The method of claim 1, wherein acquiring the receipt associated with the application on the user device comprises:

attempting to acquire an updated receipt associated with the application on the user device from the content provider device; and when the updated receipt is acquired from the content provider device, using the updated receipt as the receipt; and when the updated receipt is not acquired from the content provider device, using a stored copy of a prior receipt associated with the application on the user device that was previously acquired from the content provider device as the receipt.

8. The method of claim 7, wherein attempting to acquire the updated receipt from the content provider device comprises:

sending a request for the updated receipt to the content provider device using a preference order, the preference order comprising:

during a first predetermined time, if the user device is receiving power from an external power supply and a preferred network is available, sending the request for the updated receipt to the content provider device using the preferred network;

after the first predetermined time, for a second predetermined time, if the preferred network is available, sending the request for the updated receipt to the content provider device using the preferred network, regardless of a source from which the user device receives power; and after the second predetermined time, sending the request for the updated receipt to the content provider device using any available network, regardless of the source from which the user device receives power.

9. The method of claim 7, further comprising: when the updated receipt is acquired from the content provider device, storing a copy of the updated receipt.

10. The method of claim 7, further comprising: before attempting to acquire the updated receipt, determining that the application was assigned to the user of the user device.

11. The method of claim 1, wherein the predetermined functions of the application comprise an updating function and an install function, so that the application cannot be updated or reinstalled on the user device after the application has expired.

12. The method of claim 1, wherein the predetermined functions of the application further comprise predetermined operational functions of the application, so that the application will not perform some or all operations of the application after the application has expired.

13. An electronic device comprising:

one or more processors; and a non-transitory computer-readable medium including instructions that, when executed by the one or more processors, cause the electronic device to:

acquire a receipt associated with an application, wherein the application was purchased by a purchasing entity from a content provider and installed on the electronic device after being assigned to a user of the electronic device by the purchasing entity, the assigning comprising a purchasing entity device indicating, to a content provider device, that the purchasing entity is providing the user the right to use the application with predetermined functions of the application enabled, where the user device, content provider device, and purchasing entity device are distinct devices from each other and where the user, content provider and purchasing entity are distinct entities from each other;

determining, using the receipt, that the application has expired, the determining comprising acquiring, from the receipt, both a value for a revocation reason and a value for an expiration date and determining, based on the value for the revocation reason and the value for the expiration date that the application has expired, where the value for the revocation reason indicates that the purchasing entity has revoked the assignment of the application to the user; and when the application has expired, executing the application with the predetermined functions of the application disabled.

14. The electronic device of claim 13, wherein, when determining, using the receipt, if the application has expired, the processing subsystem is configured to:
   determine that the application has expired when the value for the expiration date has passed.

15. The electronic device of claim 14, wherein the electronic device further comprises:
   a display coupled to the processing subsystem;
   wherein, when the value for the expiration date has passed or is less than a threshold time away and the value for the revocation reason indicates that the assignment of the application to the user has been revoked, the processing subsystem is configured to present a message on the display indicating that the assignment of the application to the user has been revoked and that application should be purchased to enable executing the application with the predetermined functions of the application enabled after the expiration date.

16. The electronic device of claim 15, wherein, when presenting the message on the display of the electronic device indicating that the assignment of the application to the user has been revoked, the processing subsystem is configured to configure the message based on the value for the revocation reason.

17. The electronic device of claim 13, wherein, when determining, using the receipt, if the application has expired, the processing subsystem is configured to:
   determine that the application has expired when the value for expiration date is empty or set to an unspecified value and the value for the revocation reason indicates that the assignment of the application to the user has been revoked.

18. The electronic device of claim 17, wherein the electronic device further comprises:
   a display coupled to the processing subsystem;
   wherein, when the value for expiration date is empty or set to an unspecified value and the value for the revocation reason indicates that the assignment of the application to the user has been revoked, the processing subsystem is configured to present a message on the display indicating that the assignment of the application to the user has been revoked and that application should be purchased to enable executing the application with the predetermined functions of the application enabled.

19. The electronic device of claim 13, wherein, when acquiring the receipt associated with the application on the electronic device, the processing subsystem is configured to:
   attempt to acquire an updated receipt associated with the application on the electronic device from the content provider device; and
   when the updated receipt is acquired from the content provider device, use the updated receipt as the receipt; and
   when the updated receipt is not acquired from the content provider device, use a stored copy of a prior receipt associated with the application on the electronic device that was previously acquired from the content provider device as the receipt.

20. The electronic device of claim 19, wherein, when attempting to acquire the updated receipt from the content provider device, the processing subsystem is configured to:
   send a request for the updated receipt to the content provider device using a preference order, the preference order comprising:
      during a first predetermined time, if the electronic device is receiving power from an external power supply and a preferred network is available, sending the request for the updated receipt to the content provider device using the preferred network;
   after the first predetermined time, for a second predetermined time,
      if the preferred network is available, sending the request for the updated receipt to the content provider device using the preferred network, regardless of a source from which the electronic device receives power; and
   after the second predetermined time, sending the request for the updated receipt to the content provider device using any available network, regardless of the source from which the electronic device receives power.

21. The electronic device of claim 19, wherein the processing subsystem is configured to:
   store a copy of the updated receipt when the updated receipt is acquired from the content provider device.

22. The electronic device of claim 19, wherein the processing subsystem is configured to:
   determine that the application was assigned to the user of the electronic device before attempting to acquire the updated receipt.

23. The electronic device of claim 13, wherein the predetermined functions of the application comprise an updating function and an install function, so that the application cannot be updated or reinstalled on the electronic device after the application has expired.

24. The electronic device of claim 13, wherein the predetermined functions of the application further comprise predetermined operational functions of the application, so that the application will not perform some or all operations of the application after the application has expired.

25. An electronic device that provides content, comprising:
   a processing subsystem configured to:
      receive a revocation message from a purchasing entity device indicating that an assignment of an application purchased by a purchasing entity and assigned to a user is revoked;
      in response to receiving the revocation message, generate a receipt for the application, the application having been installed on a user device after being assigned to the user of the user device by the purchasing entity, the assigning comprising the purchasing entity indicating, to a content provider device, that the purchasing entity is providing the user the right to use the application with predetermined functions of the application enabled, the receipt comprising a value for an expiration date and a value for a revocation reason, the revocation reason value indicating that the assignment of the application to the user has been revoked by the purchasing entity;
      send the receipt to the user device;
   wherein the value for the expiration date and the value for the revocation reason are configured so that the user device can determine, using the receipt, that the application has expired, wherein the user device, when the application has expired, executes the application with the predetermined functions of the application disabled; and
   wherein the user device, content provider device, and purchasing entity device are distinct devices from each other and where the user and purchasing entity are distinct entities from each other.

26. The electronic device of claim 25, wherein the processing subsystem is further configured to:
  receive a request from the user device for the receipt; and
  based on the received request, send the receipt to the user device.

27. The electronic device of claim 26, wherein when, based on the received request, sending the receipt, the processing subsystem is configured to:
  determine if a current receipt contains updated information that supersedes information in a prior receipt sent to the user device; and
  when the current receipt contains updated information that supersedes information in a prior receipt, send the current receipt to the user device; and
  when the current receipt does not contain updated information that supersedes information in a prior receipt, not send the current receipt to the user device.

* * * * *